(12) United States Patent
Geiger et al.

(10) Patent No.: US 7,047,382 B2
(45) Date of Patent: May 16, 2006

(54) SYSTEM AND METHOD FOR MANAGING COMPRESSION AND DECOMPRESSION AND DECOMPRESSION OF SYSTEM MEMORY IN A COMPUTER SYSTEM

(75) Inventors: Peter Geiger, Austin, TX (US); Manuel J. Alvarez, II, Austin, TX (US); Thomas A. Dye, Austin, TX (US)

(73) Assignee: Quickshift, Inc., Austin, TX (US)

( * ) Notice: Subject to any disclaimer, the term of this patent is extended or adjusted under 35 U.S.C. 154(b) by 506 days.

(21) Appl. No.: 09/915,751

(22) Filed: Jul. 26, 2001

(65) Prior Publication Data

US 2002/0073298 A1    Jun. 13, 2002

Related U.S. Application Data

(60) Provisional application No. 60/250,177, filed on Nov. 29, 2000.

(51) Int. Cl.
    *G06F 12/00*    (2006.01)
(52) U.S. Cl. ............... 711/165; 711/2; 711/118; 711/154; 711/170; 711/205; 711/206
(58) Field of Classification Search ............ None
    See application file for complete search history.

(56) References Cited

U.S. PATENT DOCUMENTS

| | | |
|---|---|---|
| 5,490,260 A | 2/1996 | Miller et al. |
| 5,699,539 A * | 12/1997 | Garber et al. ........ 711/2 |
| 5,710,909 A | 1/1998 | Brown et al. |
| 5,729,228 A | 3/1998 | Franaszek et al. |

FOREIGN PATENT DOCUMENTS

| | | |
|---|---|---|
| WO | 97/23828 | 7/1997 |
| WO | 00/45516 | 8/2000 |

OTHER PUBLICATIONS

International Search Report, Application No. PCT/US 01/45147, Mailed Nov. 15, 2002.

* cited by examiner

*Primary Examiner*—Kevin Verbrugge
(74) *Attorney, Agent, or Firm*—Michael P. Adams; Winstead Sechrest & Minick, P.C.

(57) ABSTRACT

A method and system for allowing a processor or I/O master to address more system memory than physically exists are described. A Compressed Memory Management Unit (CMMU) may keep least recently used pages compressed, and most recently and/or frequently used pages uncompressed in physical memory. The CMMU translates system addresses into physical addresses, and may manage the compression and/or decompression of data at the physical addresses as required. The CMMU may provide data to be compressed or decompressed to a compression/decompression engine. In some embodiments, the data to be compressed or decompressed may be provided to a plurality of compression/decompression engines that may be configured to operate in parallel. The CMMU may pass the resulting physical address to the system memory controller to access the physical memory. A CMMU may be integrated in a processor, a system memory controller or elsewhere within the system.

5 Claims, 19 Drawing Sheets

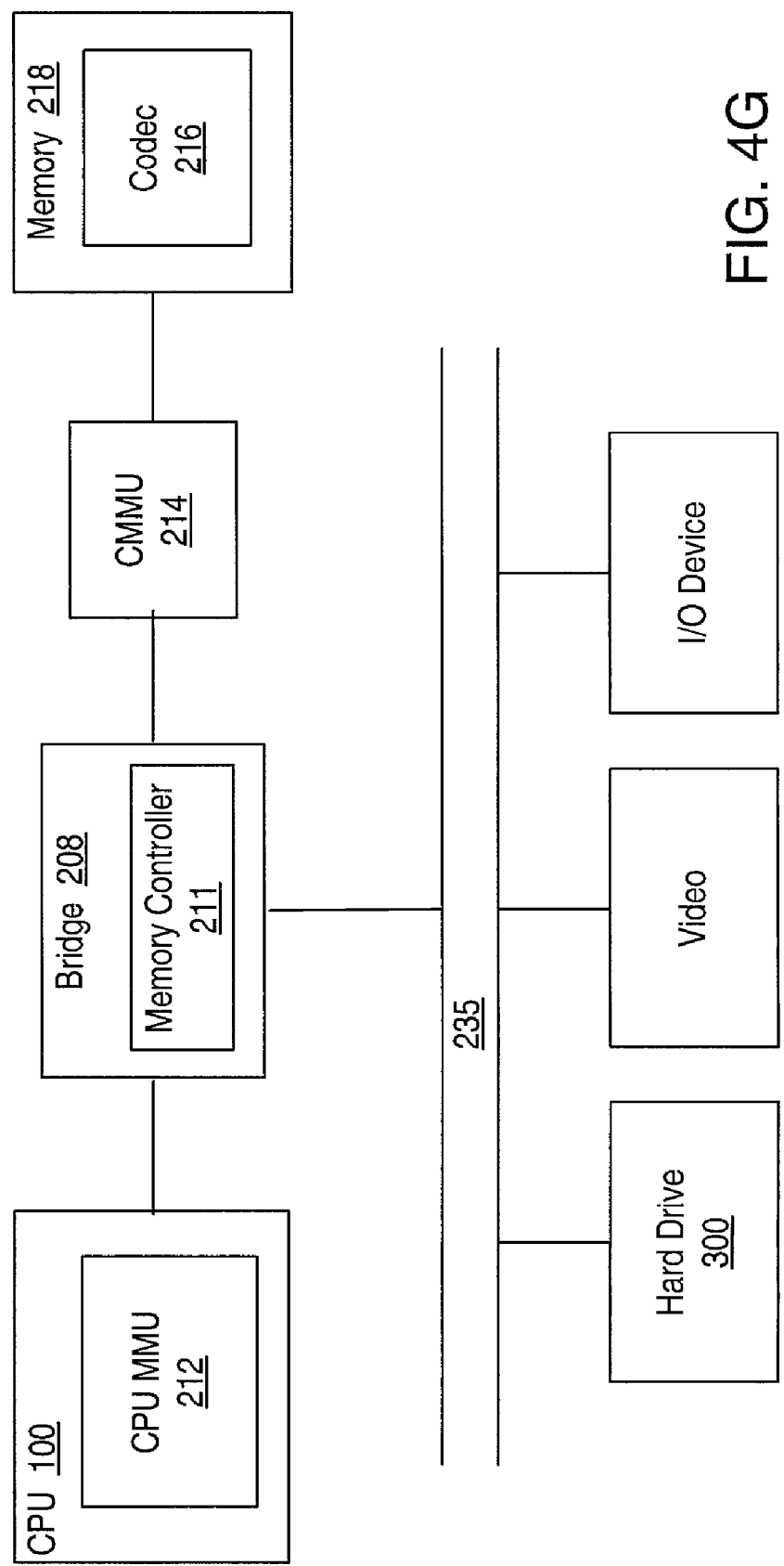

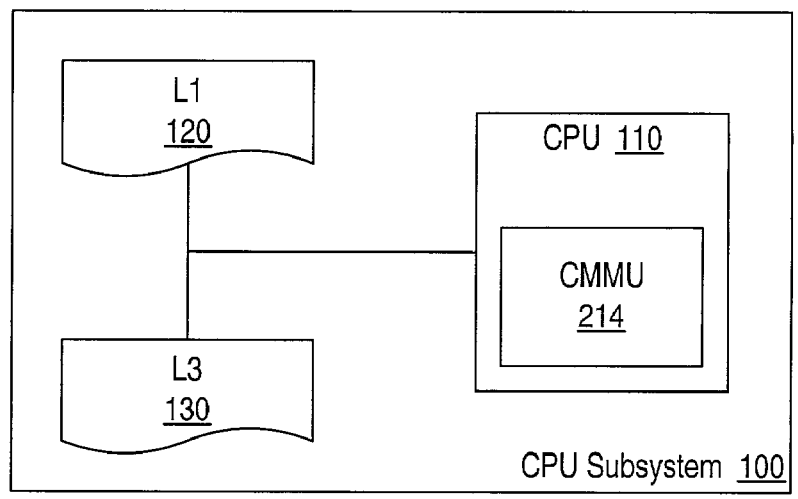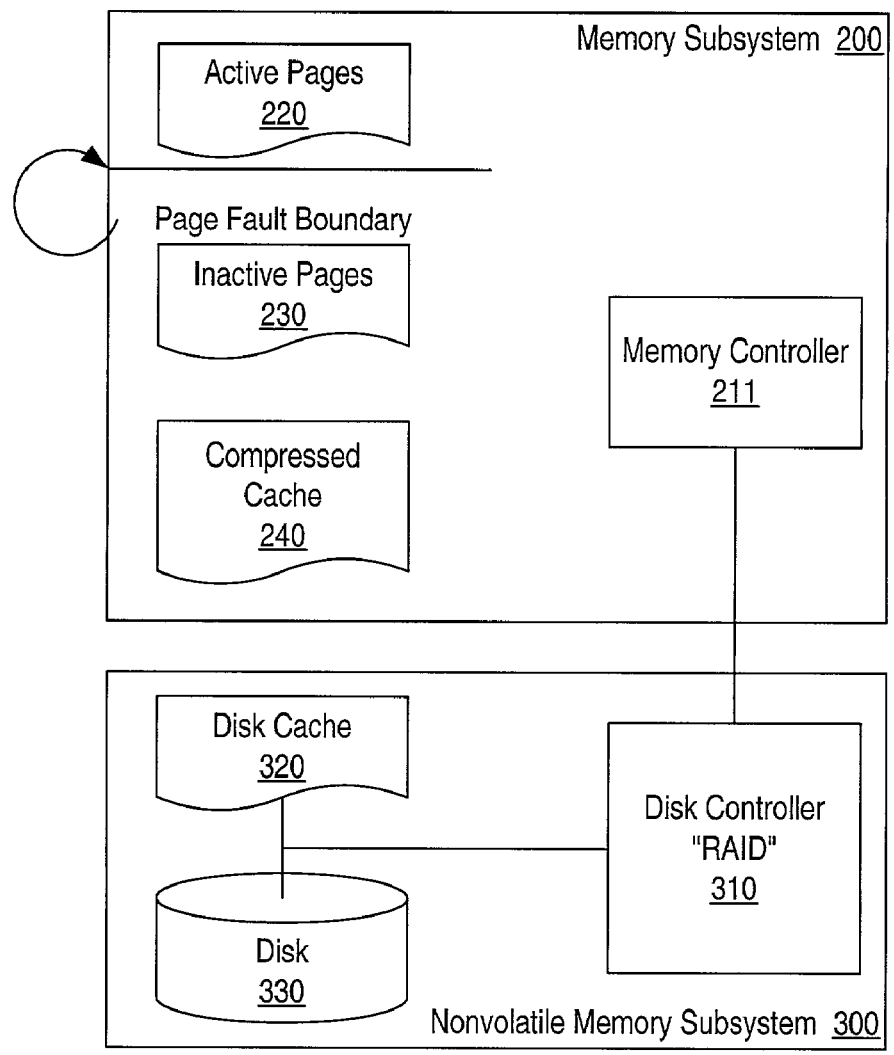
FIG. 5A

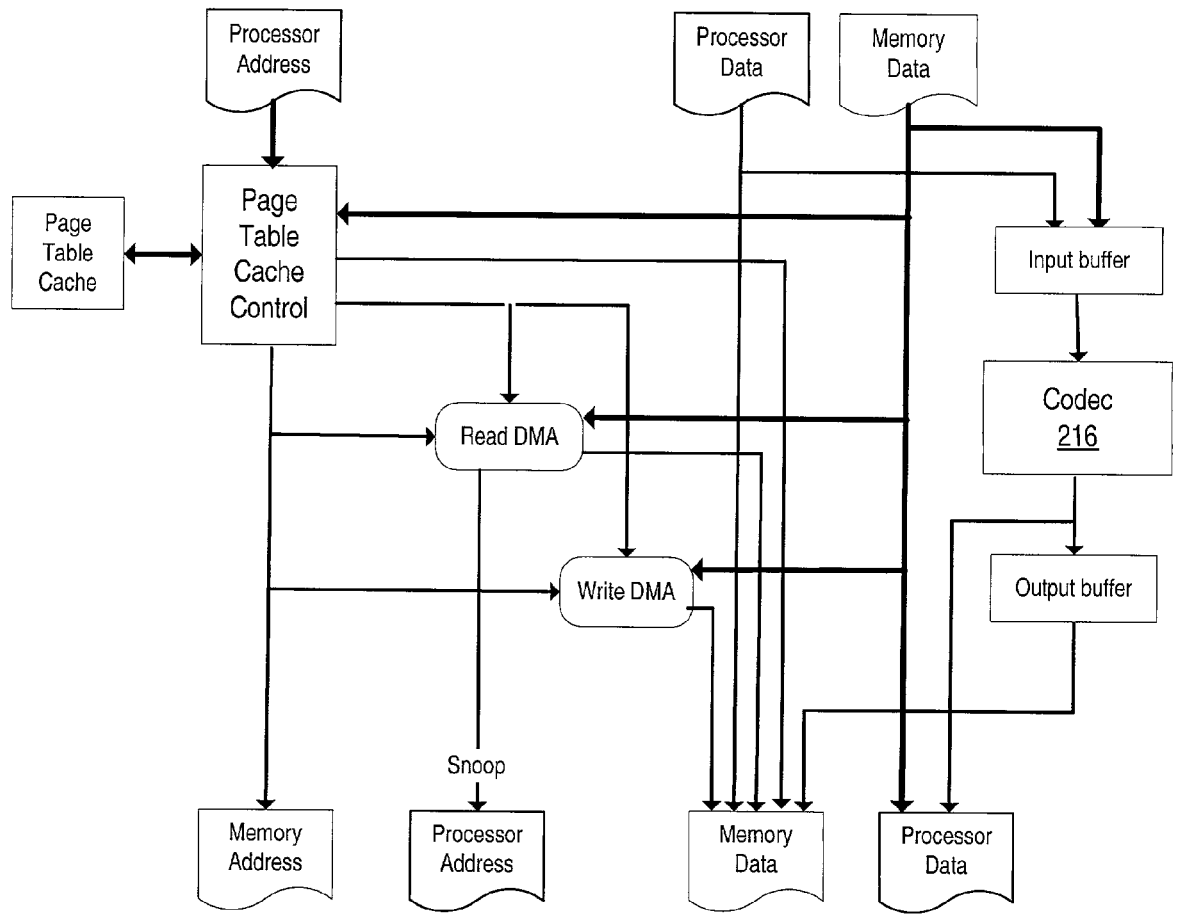
FIG. 6 - CMMU with Codec
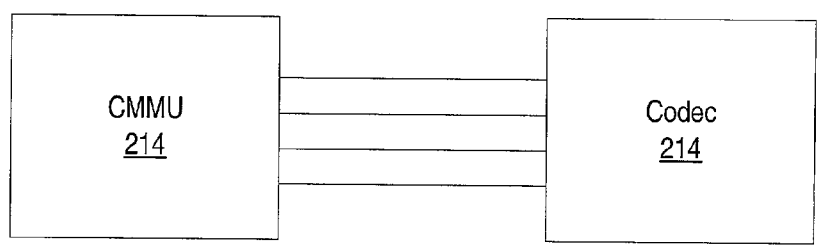
FIG. 7

SYSTEM AND METHOD FOR MANAGING COMPRESSION AND DECOMPRESSION AND DECOMPRESSION OF SYSTEM MEMORY IN A COMPUTER SYSTEM

PRIORITY CLAIM

This application claims benefit of priority of provisional application Ser. No. 60/250,177 titled "System and Method for Managing Compression and Decompression of System Memory in a Computer System" filed Nov. 29, 2000, whose inventors are Thomas A. Dye, Manny Alvarez and Peter Geiger.

FIELD OF THE INVENTION

The present invention relates to memory systems, and more particularly to an integrated compressed memory management unit comprising a compression/decompression circuit where the unit operates to improve performance of a computing system by the storage of compressed system memory data in system memory or physical memory.

DESCRIPTION OF THE RELATED ART

Computer system and memory subsystem architectures have remained relatively unchanged for many years. While memory density has increased and the cost per storage bit has decreased over time, there has not been a significant improvement to the effective operation of the memory subsystem or the software which manages the memory subsystem. The majority of computing systems presently use a software implemented memory management unit which performs virtual memory functions. In a virtual memory system, the non-volatile memory (e.g., hard disk) is used as a secondary memory to provide the appearance of a greater amount of system memory. In a virtual memory system, as system memory becomes full, least recently used (LRU) pages are swapped to the hard disk. These pages can be swapped back to the system memory when needed.

Software-implemented compression and decompression technologies have also been used to reduce the size of data stored on the disk subsystem or in the system memory data. Current compressed data storage implementations use the system's CPU executing a software program to compress information for storage on disk. However, a software solution typically uses too many CPU compute cycles and/or adds too much bus traffic to operate both compression and decompression in the present application(s). This compute cycle problem increases as applications increase in size and complexity. In addition, there has been no general-purpose use of compression and decompression for in-memory system data. Prior art systems have been specific to certain data types. Thus, software compression has been used, but this technique limits CPU performance and has restricted use to certain data types.

Similar problems exist for programs that require multiple applications of software threads to operate in parallel. Software compression does not address heavy loaded or multi-threaded applications, which require high CPU throughput. Other hardware compression solutions have not focused on "in-memory" data (data which reside in the active portion of the memory and software hierarchy). These solutions have typically been I/O data compression devices located away from the system memory or memory subsystem. In general, the usage of hardware compression has been restricted to slow input and output devices usually located at the I/O subsystem, such as the hard drive.

Mainframe computers have used data compression for acceleration and reduction of storage space for years. These systems require high dollar compression modules located away from the system memory and do not compress in-memory data in the same memory subsystem for improved performance. Such high dollar compression subsystems use multiple separate engines running in parallel to achieve compression speeds at super computer rates. Multiple separate, serial compression and decompression engines running in parallel are cost prohibitive for general use servers, workstations, desktops, or mobile units.

Lower cost semiconductor devices have been developed that use compression hardware. However, these devices do not operate fast enough to run at memory speed and thus lack the necessary performance for in-memory data. Such compression hardware devices are limited to serial operation at compression rates that work for slow I/O devices such as tape backup units. The problem with such I/O compression devices, other than tape backup units, is that portions of the data to compress are often too small of a block size to effectively see the benefits of compression. This is especially true in disk and network subsystems. To operate hardware compression on in-memory data at memory bus speeds requires over an order of magnitude more speed than present day state-of-the-art compression hardware.

Prior Art Computer System Architecture

FIG. 1 illustrates a block diagram example of a prior art computer hardware and software operating system hierarchy of present day computing systems. The prior art memory and data storage hierarchy comprises the CPU Subsystem 100, the main memory subsystem 200, and the disk subsystem 300. The CPU subsystem 100 may comprise an L1 cache memory 120 and an L2 cache memory 130 coupled to the CPU 110 and the CPU's local bus 135. The CPU subsystem 100 is coupled to the main memory subsystem 200 through the CPU local bus 135. The main memory subsystem 200 is also coupled to the disk subsystem 300. The main memory subsystem 200 comprises the memory controller 210, for controlling the main system memory banks, active pages of memory 220, inactive pages of memory 230, and a dynamically defined page fault boundary 232. The page fault boundary 232 is dynamically controlled by the virtual memory manager software 620 to optimize the balance between active and inactive pages in the system memory and "stale" pages stored on disk. The memory subsystem 200 is coupled to the I/O or disk subsystem 300 by the I/O peripheral bus interface 235, which may be one of multiple bus standards or server/workstation proprietary I/O bus interfaces, e.g., the PCI bus. For purpose of illustration, the I/O disk subsystem 300 comprises the disk controller 310, the optional disk cache memory 320, and the actual physical hard disk or disk array 330 which is used to store nonvolatile/non-active pages. In general, multiple subsections of CPU 100, memory 200, and disk 300 subsystems may be used for larger capacity and/or faster operation.

The prior art drawing of FIG. 1 also illustrates the software operating system 600. The typical operating system (OS) comprises multiple blocks. FIG. 1 shows a few of the relevant OS blocks, including the virtual memory manager (VMM) 620, file system 640, and disk drivers 660.

The operation of prior art systems for storage and retrieval of active and non-active pages from either the system memory or the disk is now described for reference. Again referring to the prior art system of FIG. 1, the VMM 620 is responsible for allocation of active pages and reallocation of inactive pages. The VMM 620 defines page fault boundary 232 separating the active pages 220 and the inactive pages 230 located in both the system memory subsystem 200 and disk subsystem 300. An active page may be defined as an area or page of memory, typically 4096 bytes, which is actively used by the CPU during application execution. Active pages reside between or within system memory or CPU cache memory. An inactive page may be defined as an area or page of memory, typically 4096 bytes, which is not directly accessed by the CPU for application execution. Inactive pages may reside in the system memory, or may be stored locally or on networks on storage media such as disks. The page fault boundary 232 is dynamically allocated during run time operation to provide the best performance and operation as defined by many industry standard algorithms such as the LRU/LFU lazy replacement algorithm for page swapping to disk. As applications grow, consuming more system memory than the actual available memory space, the page fault boundaries 232 are redefined to store more inactive pages 230 in the disk subsystem 300 or across networks. Thus, the VMM 620 is responsible for the placement of the page fault boundary 232 and the determination of active pages 220 and inactive pages 230, which reside in memory and on the disk subsystem 300.

The file system software 640, among other tasks, and along with the disk drivers 660, are responsible for the effective movement of inactive pages between the memory subsystem 200 and the disk subsystem 300. The file system software 640 may have an interface that is called by the VMM 620 software for the task of data movement to and from the computer disk and network subsystems. The file system 640 software maintains file allocation tables and bookkeeping to locate inactive pages that have been written to disk. In order for the file system to operate, the file system calls the software disk drivers 660 for DMA control of data movement and physical disk control. Instructions are programmed into the disk controller 310 of the disk subsystem 300 by the file system 640 software. Thus, when application data exceeds the available system memory space, the VMM 620 allocates and reallocates active and inactive pages for best operation of application data and instructs the file system 640 to instruct the disk driver 660 to carry out the DMA operation and page movement tasks.

FIG. 2 illustrates a block diagram example of a prior art computer system memory configuration with a Host Bus or CPU local bus 135 coupled to a Memory Controller. Four standard DIMMs are shown installed in the memory slots. In this system, data written to system memory is received from the host bus by the memory controller and written to one or more of the DIMMs "as is", with the possible inclusion of error correction information. The memory controller may include error correction and detection logic (ECC) to detect errors on data read back from memory. This is generally accomplished by appending error detection data to the written data; for example, a 64-bit write to memory may have 8-bit error detection data appended to the 64 bits.

The amount of system memory available for executing processes within Prior Art computer systems is generally limited by the amount of physical memory installed in the system. It is desirable to provide a method of increasing the effective size of system memory without increasing actual physical memory, and to thus allow processors and/or I/O masters of the system to address more system memory than physically exists.

SUMMARY OF THE INVENTION

The present invention comprises various embodiments of a system, such as a computer system, that includes a Compressed Memory Management Unit (CMMU) and one or more compression/decompression engines. In various embodiments, the CMMU may be comprised either in the CPU, the system memory controller, or on a separate chip. Where the computer system includes multiple CPUs, the CMMU may be comprised in one or a plurality of the CPUs. The one or more compression/decompression engines may be comprised in the CPU, the system memory controller, or in the memory subsystem, e.g., on one or more memory modules, or elsewhere in the system.

The Compressed Memory Management Unit (CMMU) may operate in conjunction with the one or more compression/decompression engines to allow a processor or I/O master to address more system memory than physically exists. The CMMU may translate system addresses received in system memory accesses into physical addresses. The CMMU may pass the resulting physical address to the system memory controller to access physical memory (system memory). In one embodiment, the CMMU may manage system memory on a page granularity. The CMMU may increase the effective size of system memory by storing the least recently used pages in a compressed format in system memory (and possibly also on the hard drive), and storing the most recently and frequently used pages uncompressed in system memory. The most recently and frequently used data may also be cached in one or more locations, such as in an L1, L2, and/or L3 cache.

In one embodiment, a programmable compression ratio may be used in determining the amount by which the system memory address space can be increased. In one embodiment, the CMMU may monitor the actual compression ratio and, if the actual ratio drops below a threshold compression ratio, may act to compress one or more uncompressed pages to thus maintain the desired programmed compression ratio.

In some embodiments, the operating system may be aware of the increased size of system memory provided by the CMMU. In embodiments where the operating system is aware, a kernel driver may be used to ensure that the operating system may safely use the entire system memory space without overflowing physical memory. In other embodiments, the operating system may not be aware of the increased size of system memory. In embodiments where the operating system is not aware of the increased size of system memory, only the kernel driver may be aware of the increased size of system memory. The kernel driver may selectively compress system memory pages into a portion of the system memory, referred to as a compressed cache. In one embodiment, the compressed cache may dynamically vary in size. In one embodiment where the operating system is not aware of the increased size of system memory, the CMMU may allocate additional space by using physical addresses above locations of physical memory. In yet other embodiments, the operating system may be aware of the increased size of a first portion of the system memory, but not be aware of the increased size of the second portion of the system memory provided by the CMMU.

In one embodiment, the CMMU may be integrated into a system memory controller. For example, the CMMU may be integrated into PC chipset logic, e.g. a North Bridge and/or South Bridge. In another embodiment, the CMMU may be integrated into a CPU or CPU chip.

The CMMU may include, but is not limited to, the following hardware components: a Page Translation Cache (PTC) and one or more scatter/gather DMA channels. In one embodiment, the CMMU may include a compression/decompression engine (CODEC). In one embodiment, the PTC may be fully associative. Software resources that the CMMU manages may include, but are not limited to: a Page Translation Table (PTT) comprising Page Translation Entries (PTEs), Uncompressed Pages (UPs), and Compressed Blocks (CBs). The PTC may include one or more recently or frequently used PTEs from the PTT, and may thus reduce the overhead of accessing a frequently or recently used PTE from the PTT stored in physical memory. In one embodiment, the unused Ups may be linked together to form an Uncompressed Page Free List (UPFL). In one embodiment, the unused CBs may be linked together to form a Compressed Block Free List (CBFL). In one embodiment, the PTEs that reference uncompressed pages may be linked together to form an Uncompressed Least Recently Used (LRU) List (ULRUL). In one embodiment, the PTEs that reference compressed blocks may be linked together to form a Compressed LRU List (CLRUL).

When a processor or I/O master generates an access to system memory, the CMMU may translate the system memory address of the access into a physical memory address. In translating the system memory address, the CMMU may perform a PTC lookup. If the PTE is already in the PTC, and if the PTE points to an uncompressed page, then the CMMU may pass the pointer to the uncompressed page from the PTE to the memory controller. The memory controller may use this pointer to directly access physical memory for the access. If the PTE is not already in the PTC, then the CMMU may read the PTE from the PTT located in physical memory. The CMMU may then write or cache the PTE to the PTC as a recently or frequently used PTE. Once the PTE is obtained, either from the PTC or read from the PTT, the PTE may be used to access the uncompressed page. In the case of a read, the uncompressed page may be readily returned to the requesting processor or I/O master.

If the PE points to a compressed page, then the CMMU may read the PTE from the PTT located in physical memory into the PTC (if it was not already cached in the PTC), and may load the pointer to the first compressed block from the PTE into the DMA channel. The DMA channel may read the appropriate number of linked compressed blocks and copy them into the CODEC. The CODEC may decompress the compressed page substantially in real-time. For example, the CODEC may decompress the compressed page at a sufficient speed such that, to the accessing processor or I/O master, there is no detectable delay in the memory access, or in one embodiment less than a 5% delay detected in the memory access, or in one embodiment less than a 20% delay detected in the memory access. In one embodiment, a parallel decompression algorithm as described below may be used.

After decompression has been performed, the uncompressed page or data may be provided directly to the accessing processor or I/O master from the CODEC to satisfy the access. Alternatively, the uncompressed page or data may be stored back in system memory and accessed from there. In addition, after decompression, the DMA channel may read the uncompressed page from the CODEC and copy it into an unused page in system memory pointed to by an entry in an Uncompressed Page Free List (UPFL). The compressed blocks pointers may be returned to a Compressed Block Free List (CBFL). The CMMU may update the PTE to point to the uncompressed page. In an embodiment where the uncompressed page is written back to system memory and accessed from there, the CMMU may update the CLRUL and ULRUL appropriately. The CMMU may pass the pointer to the uncompressed page to the memory controller, and the memory controller may use this pointer to directly access physical memory. Thus, when a request for a compressed page occurs, the compressed page is decompressed in the memory controller in real time, and the resulting uncompressed page may be either 1) provided directly to the requestor and stored back in system memory or 2) stored back in system memory and accessed from there.

When the CMMU needs to compress an uncompressed page, for example, to free up additional space in system memory, the CMMU may perform a PTC lookup. If the PTE is already in the PTC, then the CMMU may obtain the PTE from the PTC and load the pointer to the uncompressed page from the PTE into the DMA channel. If the PTE is not already in the PTC, then the CMMU may read the PTE from the PTT located in physical memory. In one embodiment, the CMMU may then load or cache the PTE into the PTC. The DMA channel may read the uncompressed page from physical memory and load it into the CODEC. The CODEC may compress the page in real-time, e.g. at memory speed. In one embodiment, a parallel compression/decompression algorithm may be used as described herein. The DMA channel may read the compressed page from the CODEC and copy it into linked compressed blocks from the CBFL. The address of the uncompressed page may be returned to the UPFL. The CMMU may update the PTE in physical memory to point to the first compressed block of the compressed page. The CMMU may update the CLRUL and ULRUL as needed. Thus, when additional space is desired in system memory, the CMMU may operate to read uncompressed pages (preferably least recently used uncompressed pages), compress them, and store them back into the system memory as compressed pages, thus freeing up space in system memory.

In one embodiment where the operating system is aware of the increased size of system memory, the CMMU may be initialized and enabled by BIOS. In one embodiment where the operating system is not aware of the increased size of system memory, the CMMU may be initialized and enabled during BIOS. In another embodiment where the operating system is not aware of the increased size of system memory, the CMMU may be initialized and enabled after the operating system has booted.

As noted above, in an embodiment where the operating system is aware of the increased size of system memory, the kernel driver may be used to ensure that the operating system is able to safely use the entire system memory space without overflowing physical memory. In one embodiment, the kernel driver may accomplish this by ensuring that a minimum average compression ratio across the entire system memory space is maintained. In one embodiment, the CMMU may provide an Application Programming Interface (API) that enables a kernel driver to initiate various CMMU operations.

In one embodiment, one or more Compression/Decompression engines (CODECs) may be optimized to perform page-based compressions and decompressions. If a system memory page is uncompressible, then the CMMU keeps the page uncompressed. In one embodiment, a plurality of DMA-based CODECs may be included. In one embodiment, the one or more CODECs may include at least one parallel data compression and decompression engine, designed for the reduction of data bandwidth and storage requirements and for compressing/decompressing data at a high rate.

In one embodiment, one or more pages may be very highly compressed so that the pages take up much less space in the memory. In one embodiment, this may be performed by setting an attribute in the page translation entry that references the page. In one embodiment, the attribute is a single bit that may be set to indicate the page is highly compressed. In one embodiment, setting this attribute forces the page to be compressed to the maximum amount so that the page takes zero space. A highly compressed page may be represented by an entry in the page table that does not actually point to any blocks of memory. Any compressed or uncompressed blocks formerly occupied by the page may be returned to the memory for use by other processes. In one embodiment, marking pages as Highly Compressible may occur when the operating system is aware of compression, and the current or actual compression ratio is near or below a threshold compression ratio. In one embodiment, a pool of pages that are inactive and clean may be available to be highly compressed to meet the required compression ratio.

The CMMU may monitor the performance of compressibility in the system. The amount of data that can be active for any one program may be restricted, and a pool of inactive pages that represent the least recently used active pages may be maintained. Some of these pages may be compressed and some of them may be uncompressed. Active pages may be dirty or clean. Inactive pages represent real pages and comprise real data. If an active page is dirty, the page may need to be written back to disk (i.e. made clean) before moving to the inactive pool. Thus, the inactive pages by definition are clean. These inactive pages may be invalidated and marked to be very highly compressible without making any memory allocations or requiring action by or notification to the operating system.

In one embodiment, when decompressing a page, if the page is marked as highly compressed (e.g. the Highly Compressed attribute is set in the page translation entry, a "zeroed" page may be synthesized by the CMMU) rather than having the decompression engine decompress the highly compressed page. After the zeroed page is synthesized, data may be read from the non-volatile storage to the page. This data may include data that was previously written back to the non-volatile storage during the process of highly compressing the page.

In one embodiment, the system may include a plurality of compression/decompression engines (CODECs) that may each implement one of a plurality of compression algorithms and a corresponding decompression algorithm. In one embodiment, a page translation entry for a page may indicate the particular compression algorithm that was used to compress the page. In one embodiment the page translation entry may include an attribute, which may be referred to as a CODEC selector attribute, that may be set to cause a particular compression algorithm to be used to compress the page, and thus also indicates the corresponding decompression algorithm. In one embodiment, two or more different compression algorithms may be performed on the data, and one of the compression algorithms may then be selected as the desired compression algorithm for the data. The desired compression algorithm for the data may be selected, for example, based on compression ratio. In other words, the compression algorithm that yields the highest compression ratio for the data may be selected. Other criteria, or a combination of two or more criteria, may be used to select a compression algorithm from the plurality of different compression algorithms. For example, the fastest compression algorithm may be selected. When the data needs to be decompressed, the page translation entry may be examined to determine the appropriate decompression algorithm for the data, and the compressed page or pages containing the data may then be routed to one or more CODECs that implement the appropriate decompression algorithm to be decompressed. In one embodiment, the plurality of CODECs may perform the compression or decompression of the page in parallel. In one embodiment, the system may include a plurality of compression/decompression engines (CODECs) that may each implement a substantially similar compression algorithm and a corresponding decompression algorithm. In this embodiment, a page of data to be compressed or decompressed may be divided into portions, and each of the portions may be compressed or decompressed by a different CODEC. After the portions are compressed or decompressed, the uncompressed or compressed portions of the page are merged to form the uncompressed or compressed page. In one embodiment, the plurality of CODECs may perform the compression or decompression of the portions of the page in parallel.

BRIEF DESCRIPTION OF THE DRAWINGS

A better understanding of the present invention can be obtained when the following detailed description of the preferred embodiment is considered in conjunction with the following drawings, in which:

FIG. 4g is a block diagram of an embodiment of a computer system where the CMMU is included between the memory controller and the memory and the CODEC is included in the memory;

FIG. 5a is a block diagram illustrating a computer system configuration with the CMMU in the CPU according to one embodiment;

FIG. 6 is a block diagram of a CMMU according to one embodiment;

FIG. 7 is a block diagram illustrating a CMMN and a CODEC coupled by multiple DMA channels according to one embodiment;

DETAILED DESCRIPTION OF THE PREFERRED EMBODIMENT

Incorporation by Reference

The following patents and patent applications are hereby incorporated by reference in their entirety as though fully and completely set forth herein.

U.S. Pat. No. 6,173,381 titled "Memory Controller Including Embedded Data Compression and Decompression Engines" issued on Jan. 9, 2001, whose inventor is Thomas A. Dye.

U.S. Pat. No. 6,170,047 titled "System and Method for Managing System Memory and/or Non-volatile Memory Using a Memory Controller with Integrated Compression and Decompression Capabilities" issued on Jan. 2, 2001, whose inventor is Thomas A. Dye.

U.S. patent application Ser. 09/239,659 titled "Bandwidth Reducing Memory Controller Including Scalable Embedded Parallel Data Compression and Decompression Engines" whose inventors are Thomas A. Dye, Manuel J. Alvarez II and Peter Geiger and was filed on Jan. 29, 1999. Pursuant to a Response to Office Action of Aug. 5, 2002, this application is currently pending a title change from the above to "Selective Lossless, Lossy, or No Compression of Data Based on Address Range, Data Type, and/or Requesting Agent."

U.S. Pat. No. 6,208,273 titled "System and Method for Performing Scalable Embedded Parallel Data Compression" issued on Mar. 27, 2001, whose inventors are Thomas A. Dye, Manuel J. Alvarez II and Peter Geiger.

U.S. patent application Ser. No. 09/491,343 titled "System and Method for Performing Scalable Embedded Parallel Data Decompression" whose inventors are Thomas A. Dye, Manuel J. Alvarez II and Peter Geiger, and was filed on Jan. 26, 2000.

U.S. Pat. No. 6,523,102 B1 titled "Parallel Compression/Decompression System and Method for Implementation of In-Memory Compressed Cache Improving Storage Density and Access Speed for Industry Standard Memory Subsystems and In-Line Memory Modules" issued on Feb. 18, 2003, whose inventors are Thomas A. Dye, Manuel J. Alvarez II and Peter Geiger.

Figure 1:
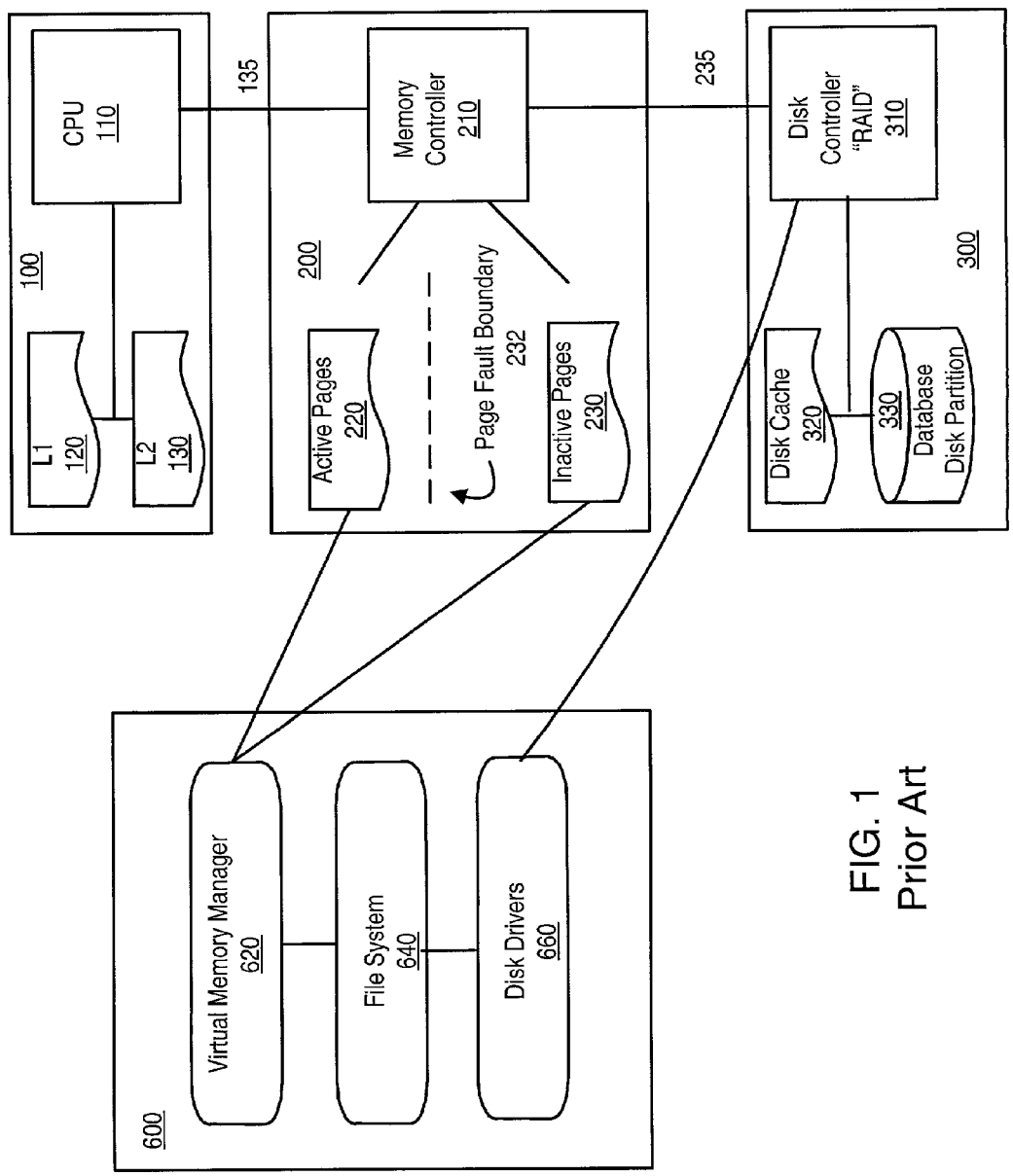
FIG. 1 illustrates the prior art computer data memory and storage hierarchy from the CPU cache, to the main system memory to the disk subsystem.
Figure 2:
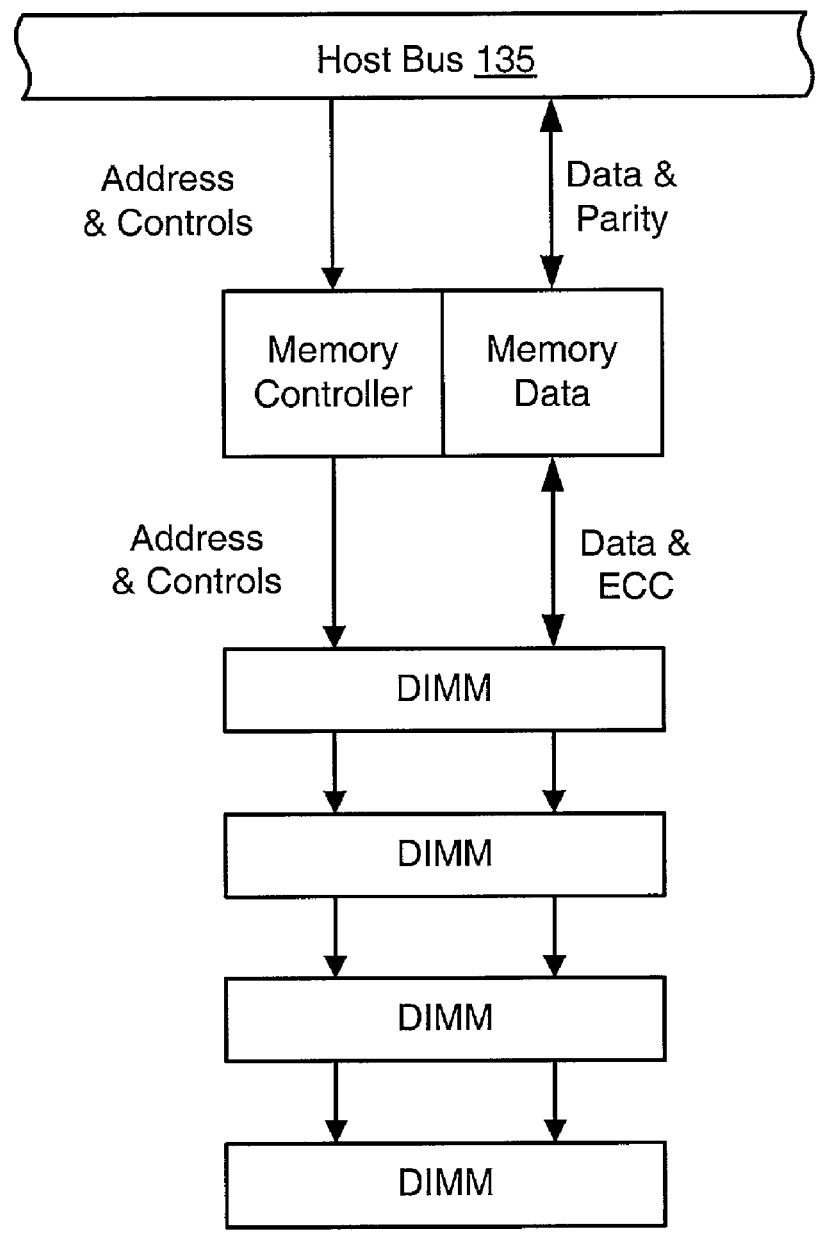
FIG. 2 is a block diagram illustrating a prior art system memory configuration.
Figure 3:
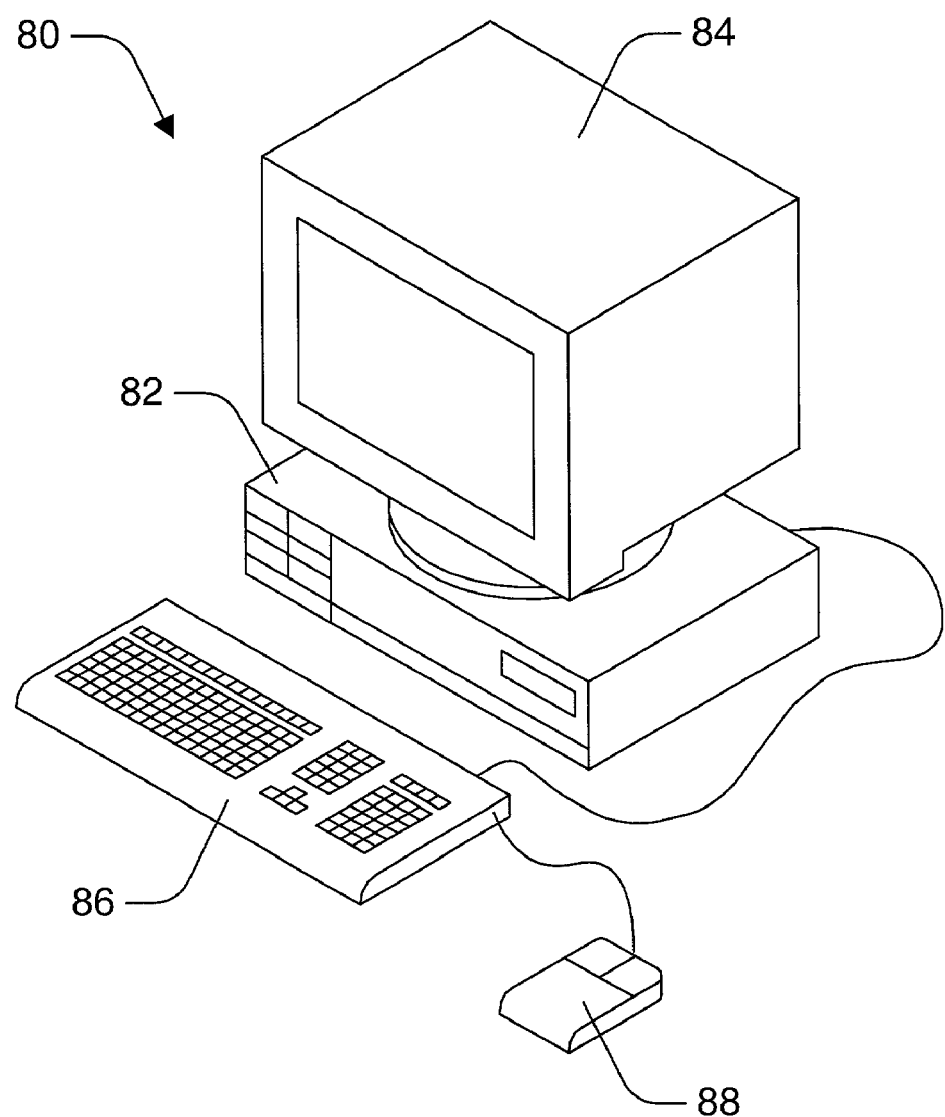
FIG. 3 illustrates an exemplary computer system which implements one embodiment of the present invention.

FIG. 3—Exemplary Computer System

FIG. 3 illustrates an exemplary computer system that may implement embodiments of the present invention. Embodiments of the present invention may be implemented in any of various systems, such as a computer system, Internet appliance, network appliance, personal digital assistant (PDA), television, telephone, such as a wireless telephone, or in general, any device that includes a memory.

FIGS. 4A–4I—Exemplary Computer System Architectures

FIGS. 4A–4I illustrate several embodiments of system architecture that include a Compressed Memory Management Unit (CMMU). As shown in FIGS. 4A–4I, the systems may include a CPU 100 coupled to a bridge 208. CPU 100 may include a Memory Management Unit (MMU) 212. The bridge 208 may include a memory controller 211. The bridge 208 may include additional logic or functionality, such as North Bridge and/or South Bridge functionality. The bridge 208 may couple to a system memory 218. The memory controller 211 in the bridge 208 may couple to system memory 218 and may manage accesses to the system memory. The bridge 208 may couple to an I/O bus 235. A hard drive or other non-volatile memory 300 may couple to the I/O bus 235. A video device and on or more other I/O device may also couple to the I/O bus 235. The various embodiments may also include one or more compression/decompression engines (CODEC) 216 that may perform data compression and decompression under control of the CMMU 214. In one embodiment, at least one of the one or more CODECs may be a parallel compression/decompression engine that may perform parallel data compression and decompression under control of the CMMU 214.

Figure 4A:
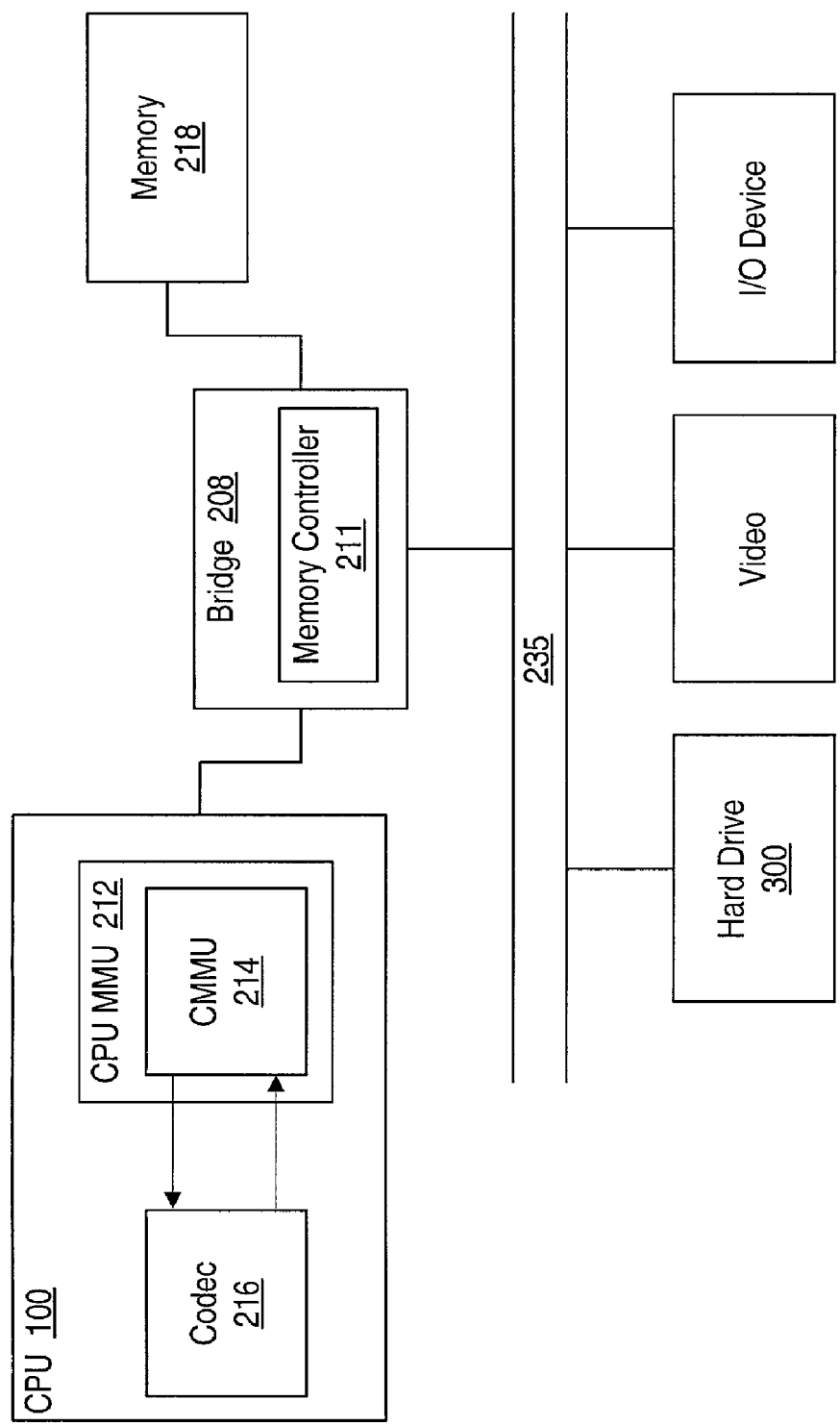
FIG. 4a is a block diagram of an embodiment of a computer system where the CMMU is included in the CPU Memory Management Unit (MMU) and the Compression/Decompression engine (CODEC) is included in the CPU subsystem.
Figure 4B:
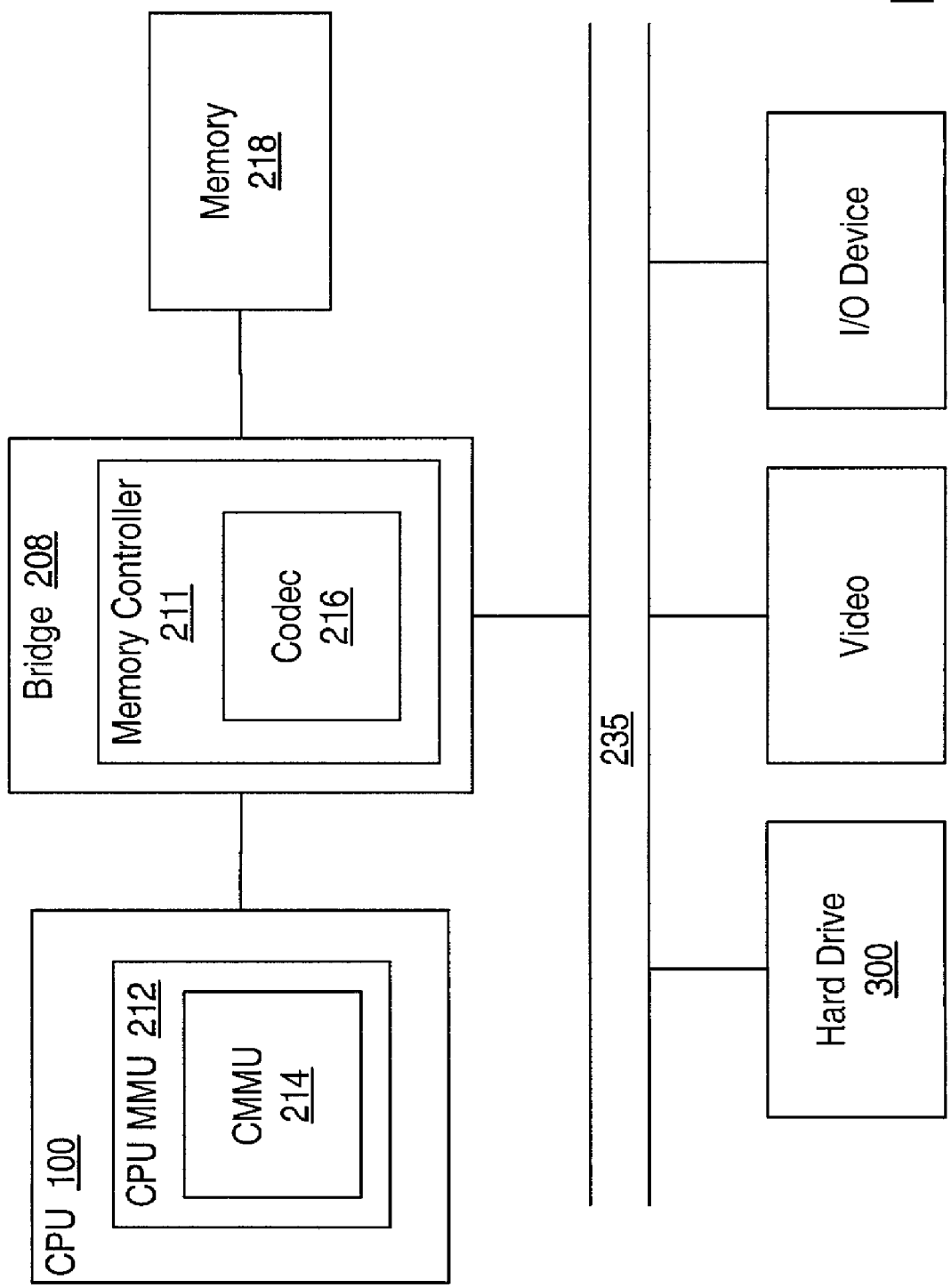
FIG. 4b is a block diagram of an embodiment of a computer system where the CMMU is included in the CPU MMU and the CODEC is included in the memory controller.
Figure 4C:
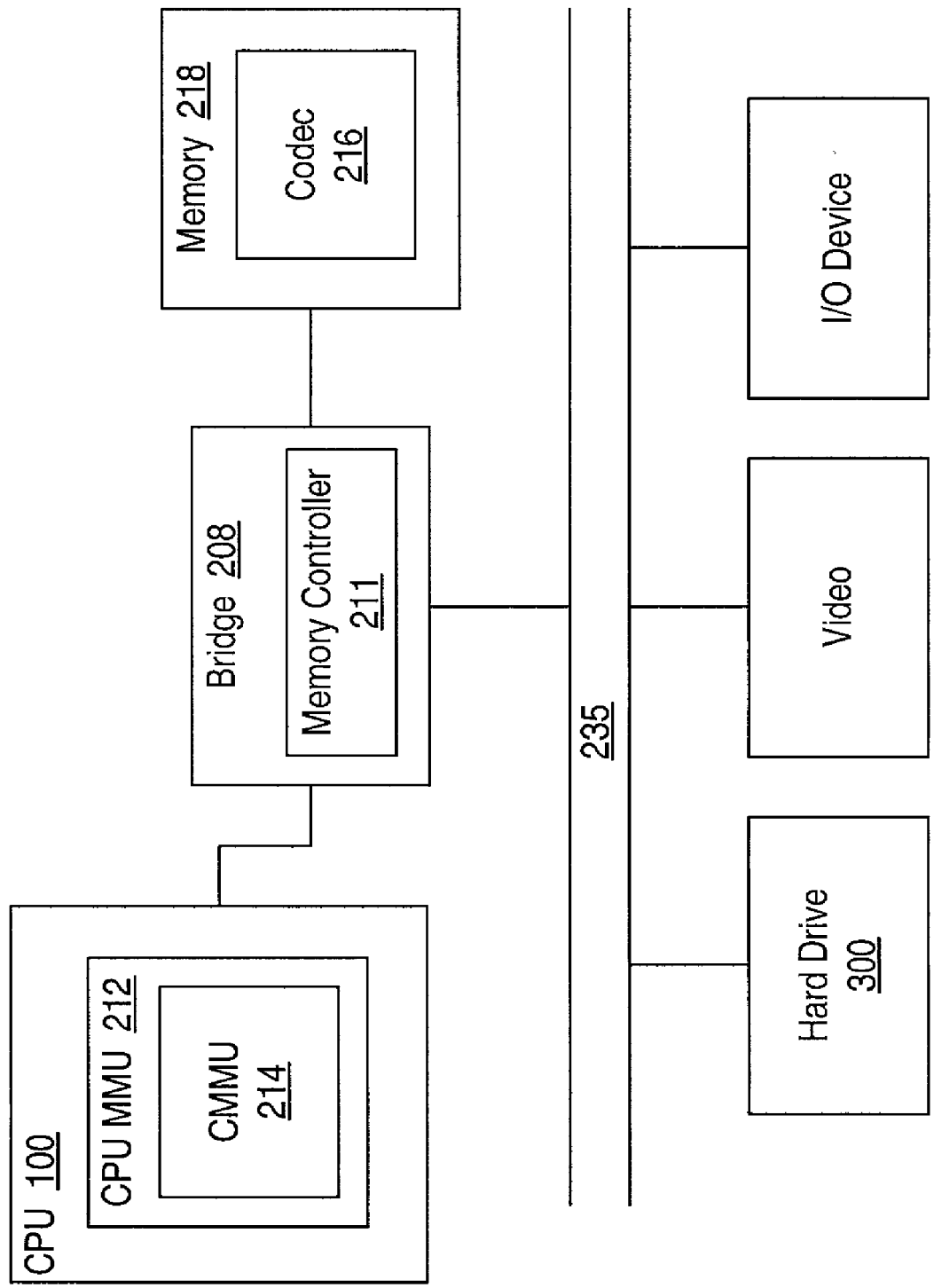
FIG. 4c is a block diagram of an embodiment of a computer system where the CMMU is included in the CPU MMU and the CODEC is included in the memory.
Figure 4D:
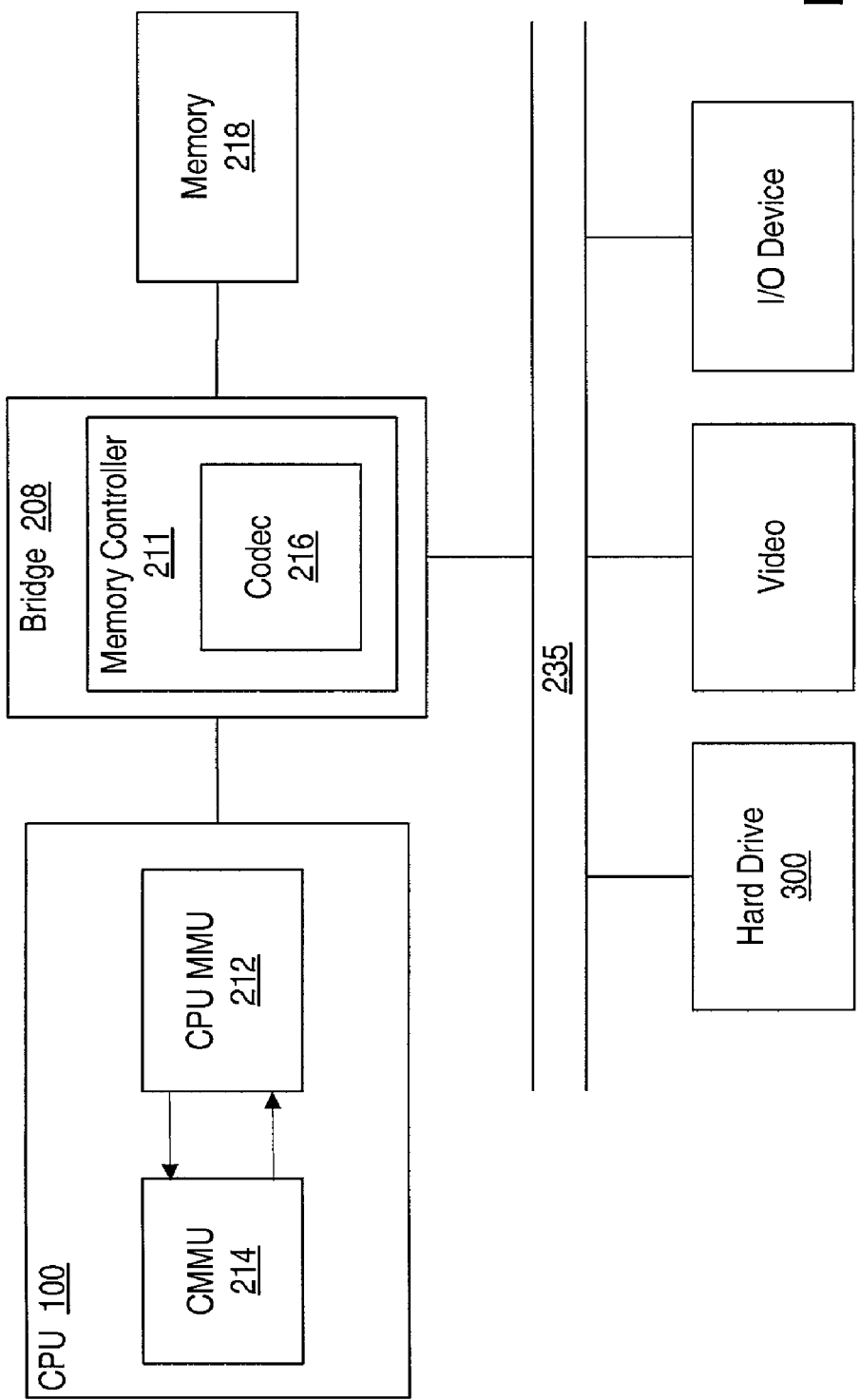
FIG. 4d is a block diagram of an embodiment of a computer system where the CMMU is included in the CPU subsystem and the CODEC is included in the memory controller.
Figure 4E:
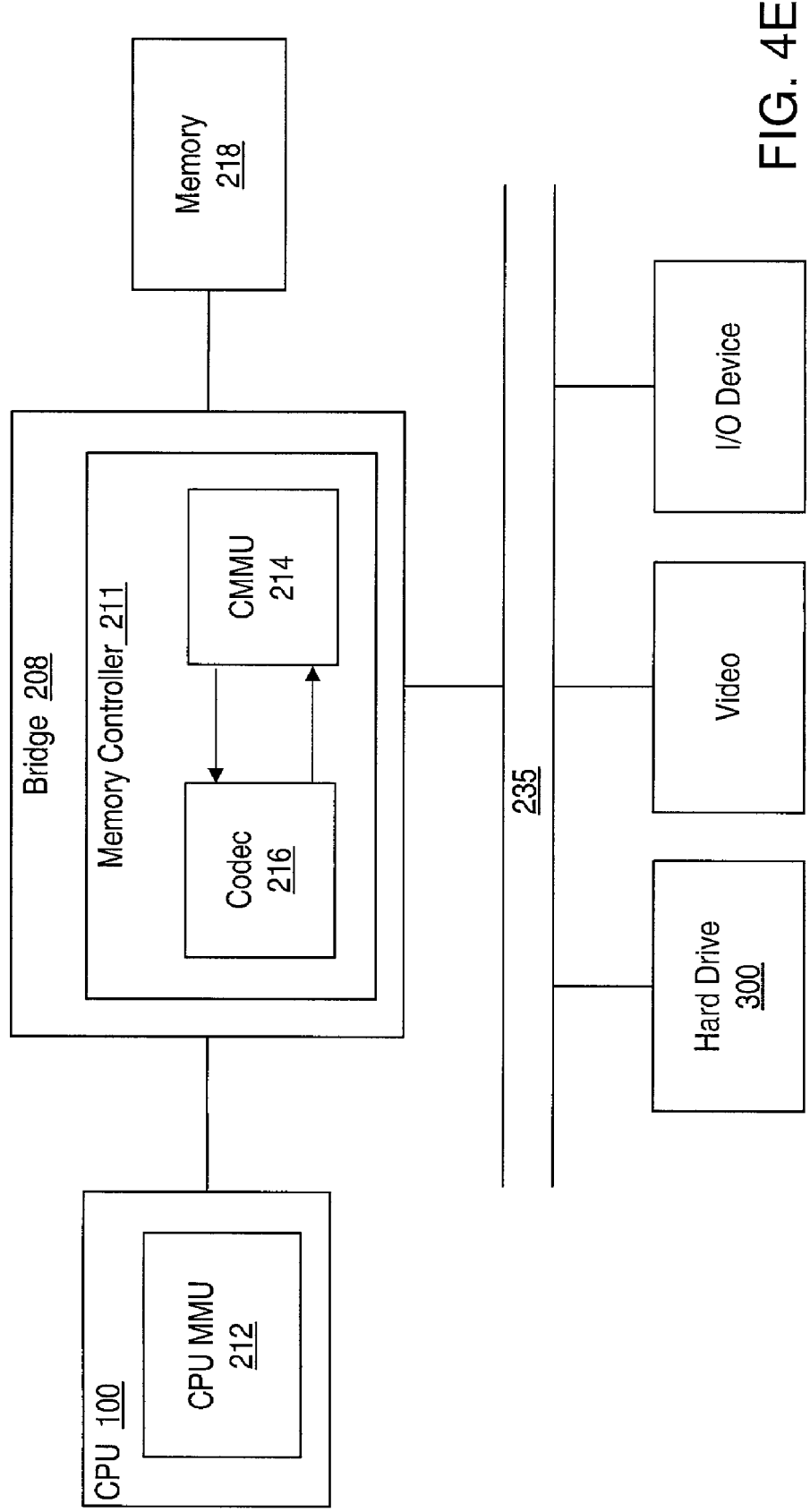
FIG. 4e is a block diagram of an embodiment of a computer system where the CMMU and the CODEC are included in the memory controller.
Figure 4F:
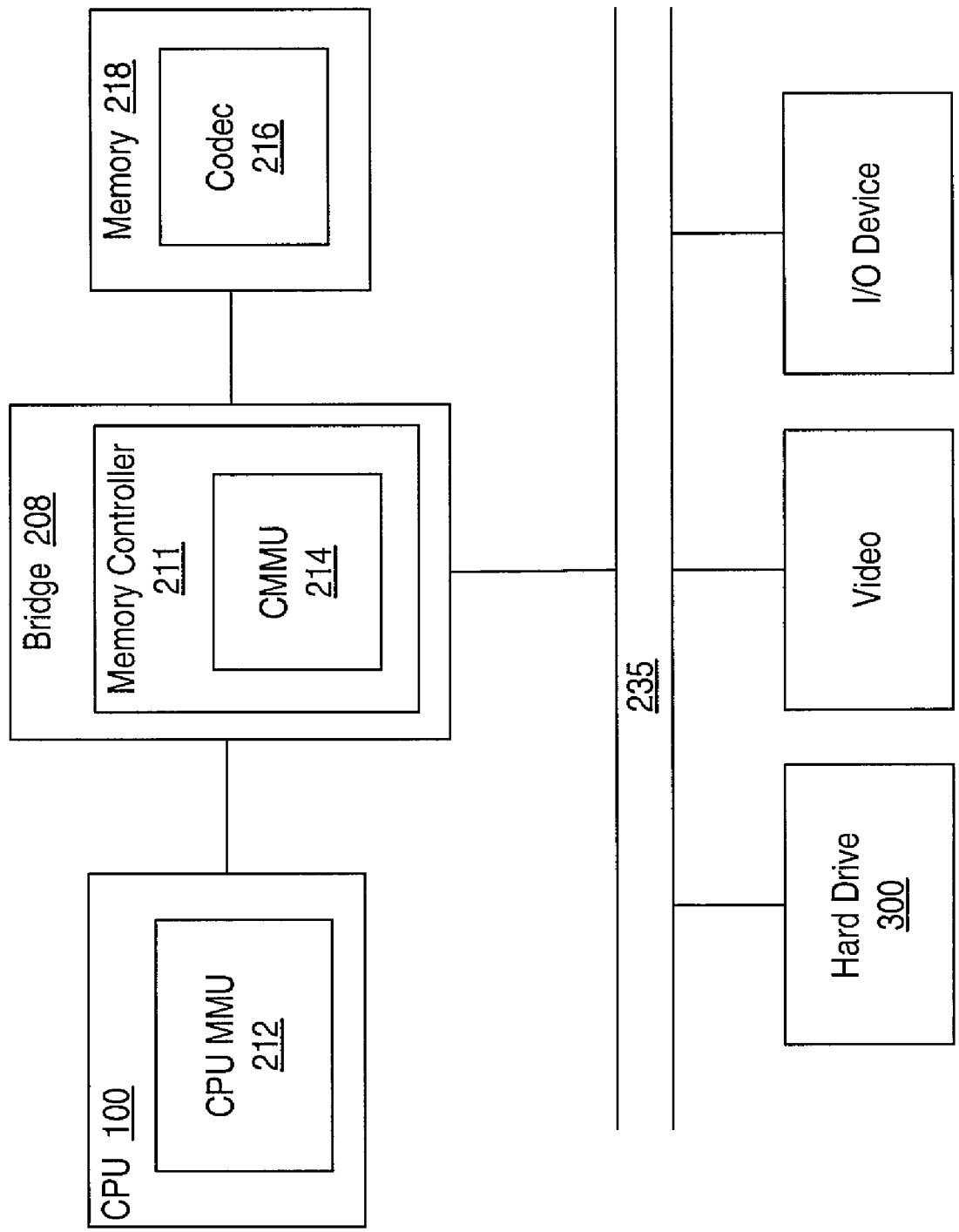
FIG. 4f is a block diagram of an embodiment of a computer system where the CMMU is included in the memory controller and the CODEC is included in the memory.
Figure 4H:
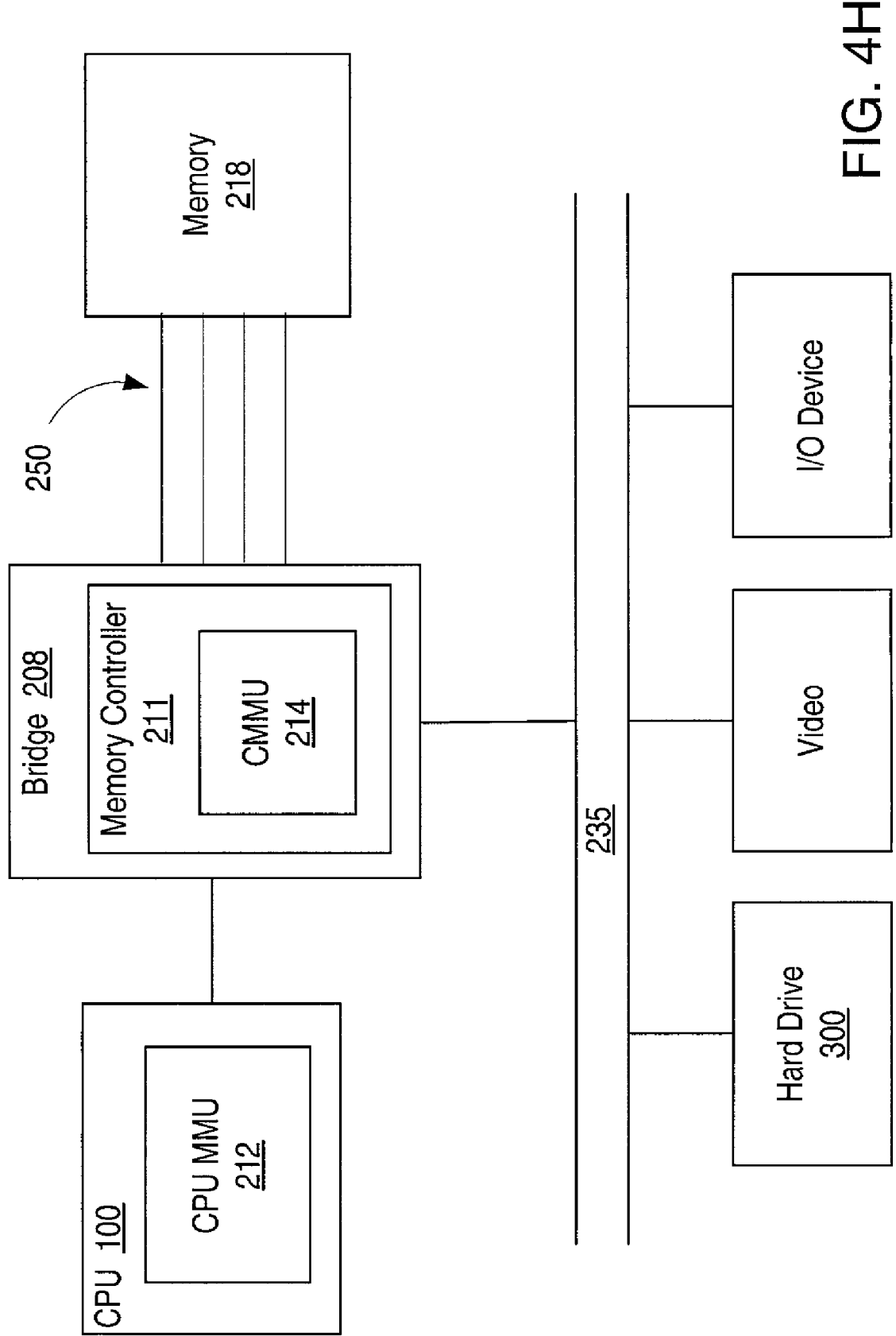
FIG. 4h is a block diagram of an embodiment of a computer system where the CMMU is included in the memory controller and there are multiple DMA channels between the memory controller and the memory.
Figure 4I:
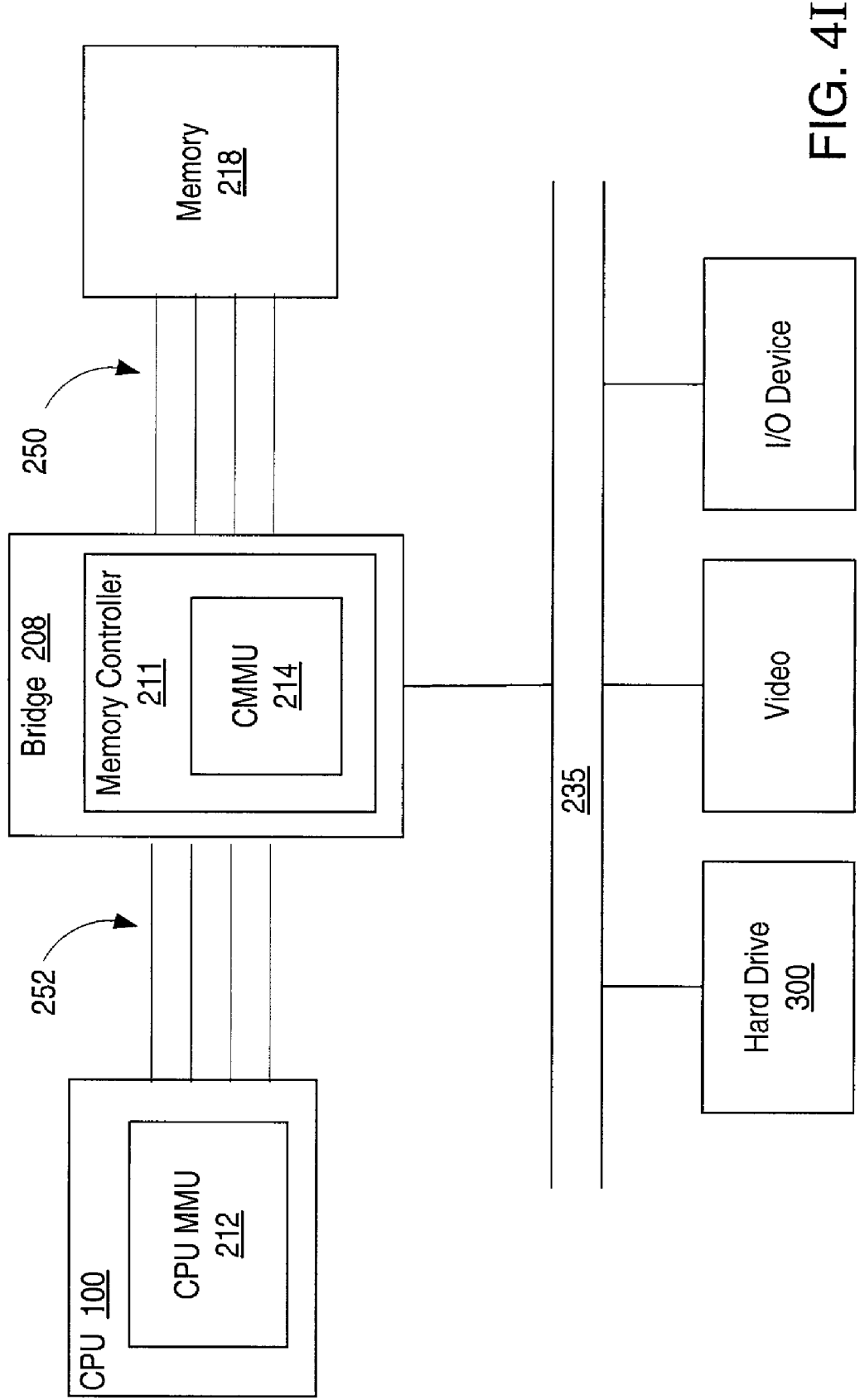
FIG. 4i is a block diagram of an embodiment of a computer system where the CMMU is included in the memory controller, there are multiple DMA channels between the CPU subsystem and the memory controller, and there are multiple DMA channels between the memory controller and the memory.

In one embodiment as illustrated in FIG. 4A, the CPU Memory Management Unit (MMU) 212 may include a CMMU 214 as described herein. In this embodiment, the CPU 100 may also include CODEC 216. In one embodiment as illustrated in FIG. 4B, the CPU Memory Management Unit (MMU) 212 may include a CMMU 214 as described herein. In this embodiment, the memory controller 211 in bridge 208 may include a CODEC 216. In one embodiment as illustrated in FIG. 4C, the CPU Memory Management Unit (MMU) 212 may include a CMMU 214 as described herein. In this embodiment, the memory 218 may include a CODEC 216. In one embodiment as illustrated in FIG. 4D, the CPU 100 may include a CMMU 214 that is implemented separately from the CPU MMU 212, and that interfaces with CPU MMU 212 to manage the compression/decompression of data using a CODEC 216. In this embodiment, the memory controller 211 in bridge 208 may include the CODEC 216. In one embodiment as illustrated in FIG. 4E, the memory controller 211 in bridge 208 may include both the CMMU 214 and the CODEC 216. In one embodiment as illustrated in FIG. 4F, the memory controller 211 in bridge 208 may include the CMMU 214. In this embodiment, the memory 218 may include a CODEC 216. In one embodiment as illustrated in FIG. 4G, the CMMU 214 may be coupled between the bridge 208 and memory 218. In this embodiment, memory 218 may include a CODEC 216. In one embodiment, as illustrated in FIG. 4H, the CMMU 214 may be included in the memory controller 211. In this embodiment, there may be a plurality of DMA channels 250 coupling the memory 218 to the bridge 208 that may be used by the CMMU 214 in transferring memory. In one embodiment, as illustrated in FIG. 4I, the CMMU 214 may be included in the memory controller 211. In this embodiment, there may be a plurality of DMA channels 250 between the memory 218 to the bridge 208 and a plurality of DMA channels 252 between the bridge 208 and the CPU subsystem 100 that may be used by the CMMU 214 in transferring memory.

Figure 5B:
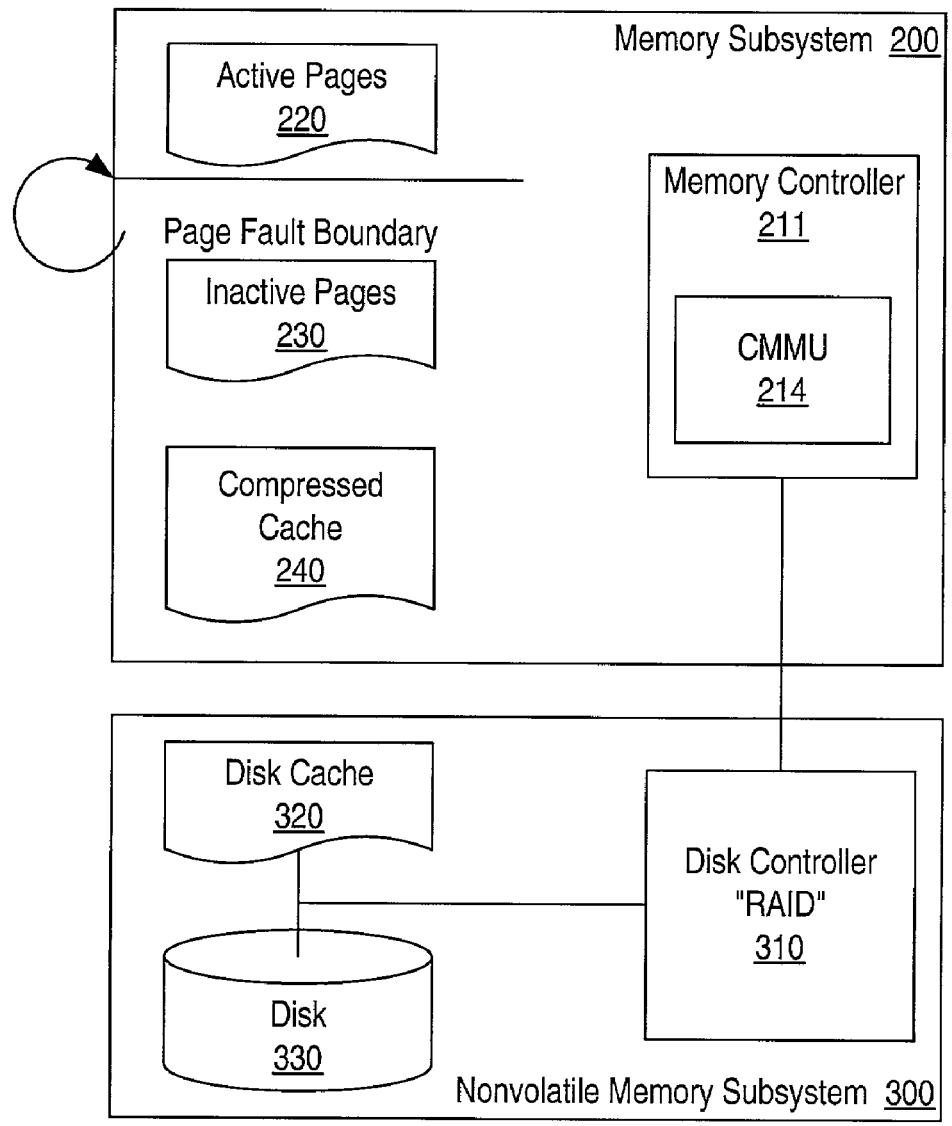
FIG. 5b is a block diagram illustrating a computer system configuration with the CMMU in the memory controller according to one embodiment.

FIGS. 5A–5B—Computer System with Compressed Cache

FIG. 5A illustrates a computer system with a Compressed Memory Management Unit (CMMU) 214 embedded in a CPU according to one embodiment. The computer system of FIG. 5A includes a CPU subsystem 100, a memory subsystem 200, and a nonvolatile memory subsystem 300. The CPU subsystem 100 may be coupled to the memory subsystem 200, which may be coupled to the disk subsystem 300. The CPU subsystem 100 includes a CPU 110 and may also include one or more caches such as an L1 cache 120 and an L2 cache 130. The CPU 210 may include a Compressed Memory Management Unit (CMMU) 214. In another embodiment, the CMMU 214 may be included in the CPU subsystem external to the CPU 110.

In one embodiment, the CMMU 214 may be driven by hardware control logic internal to the CPU subsystem 100. In one embodiment, the hardware control logic may be integrated in the CPU 210. In another embodiment, the CMMU 214 may be controlled by software, for example a driver, executable within the CPU 110.

The memory subsystem 200 may include memory controller 211 and system memory 218 (also referred to as main memory or RAM). Within the memory subsystem 200 of one embodiment, the memory controller 210 may be coupled to system memory 218. System memory 218 may be comprised of one or more volatile memory devices such as DIMMs, SIMMs, SDDIMMs, RIMMs, or C-DIMMs (compression enabled DIMMs). System memory 218 may store active pages 220, inactive pages 230, and compressed cache 240.

FIG. 5B illustrates a computer system with a Compressed Memory Management Unit (CMMU) 214 embedded in a memory controller 211 according to one embodiment. The computer system of FIG. 5B includes a CPU subsystem 100, a memory subsystem 200, and a nonvolatile memory subsystem 300. As indicated in FIG. 5B, the CPU subsystem 100 may be coupled to the memory subsystem 200, which may be coupled to the disk subsystem 300 The CPU subsystem 100 includes a CPU 110 and may also include one or more caches such as an L1 cache 120 and an L2 cache 130.

The memory subsystem includes memory controller 211 and system memory 218 (also referred to as main memory or RAM). Within the memory subsystem of one embodiment, the memory controller 210 may be coupled to system memory 218. System memory 218 may be comprised of one or more volatile memory devices such as DIMMs, SIMMs, SDDIMMs, RIMMs, or C-DIMMs (compression enabled DIMMs). System memory 218 may store active pages 220, inactive pages 230, and compressed cache 240. The memory controller 211 may include the CMMU 214. In one embodiment, the CMMU 214 may be driven by hardware control logic internal to the memory controller 211. In another embodiment, the CMMU 214 may be controlled by software, for example a driver, executable within the CPU 110.

In the embodiments illustrated in FIGS. 5A and 5B, a portion of the system memory 218, referred to as the compressed cache 240, may store compressed memory pages. Thus the compressed cache 240 may be located in the memory subsystem 200 of the computer. In one embodiment, the CMMU 214 may allocate the compressed cache 240. The compressed cache 240 may be allocated within the normal memory map of the computer system. Compressed pages may be stored in the compressed cache 240. Pages are generally 4096 bytes. In alternate embodiments, page sizes can be any size as desired by the operating system software.

Instead of swapping inactive pages to the nonvolatile memory 330, embodiments of the system and method as described herein may operate to store inactive pages in a compressed format in the compressed cache 240. In addition, pages from the compressed cache 240, which are maintained in compressed format, can be moved to disk or network in such format for future data storage, retrieval, or transmission over LANs or WANs. Thus, a second order benefit is achieved by storage of compressed pages in the I/O subsystem 300 instead of non-compressed pages.

Computer Architecture of Several Embodiments

The present invention provides various embodiments of a Compressed Memory Management Unit (CMMU) 214 that allows a processor or I/O master to address more system memory than physically exists. FIG. 6 is a block diagram illustrating the architecture of a CMMU 214 according to one embodiment. Note that CODEC 216 may be integrated in the CMMU 214 or alternatively may be external to the CMMU 214. FIG. 7 illustrates a CMMU 214 coupled to a CODEC 214 via multiple DMA channels.

The CMMU may increase the effective size of system memory by keeping the least recently used pages compressed, and the most recently and frequently used pages uncompressed in physical memory. The CMMU 214 may also increase the effective speed of system memory by storing least recently used pages in a compressed format in system memory.

A processor or I/O master accesses system memory using a system address. The CMMU 214 translates the system address into a physical address. The CMMU 214 passes the resulting physical address to the system memory controller 211 to access physical memory 218 (also called system memory). The CMMU 214 may decompress compressed data to produce uncompressed data for the memory access. The CMMU 214 may also compress uncompressed data to produce compressed data for storing in physical memory 218. One or more software sources may be used for the management of the compressed and uncompressed data in physical memory 218. In one embodiment, the CMMU 214 manages system memory 218 on page granularity. In one embodiment, the page size is programmable.

In one embodiment, the maximum compression ratio that can be achieved by the CMMU 214 is programmable. The compression ratio may influence the amount by which the system memory address space can be increased. In some embodiments, since the compressibility of system memory 218 may vary, a kernel driver may be used to ensure that a minimum compression ratio is maintained. For example, if the CMMU 214 were programmed to achieve a maximum compression ratio of 16:1, then the size of the system memory address space may be increased by 4 times. In other words, the kernel driver may ensure a minimum compression ratio of 4:1.

Figure 8:
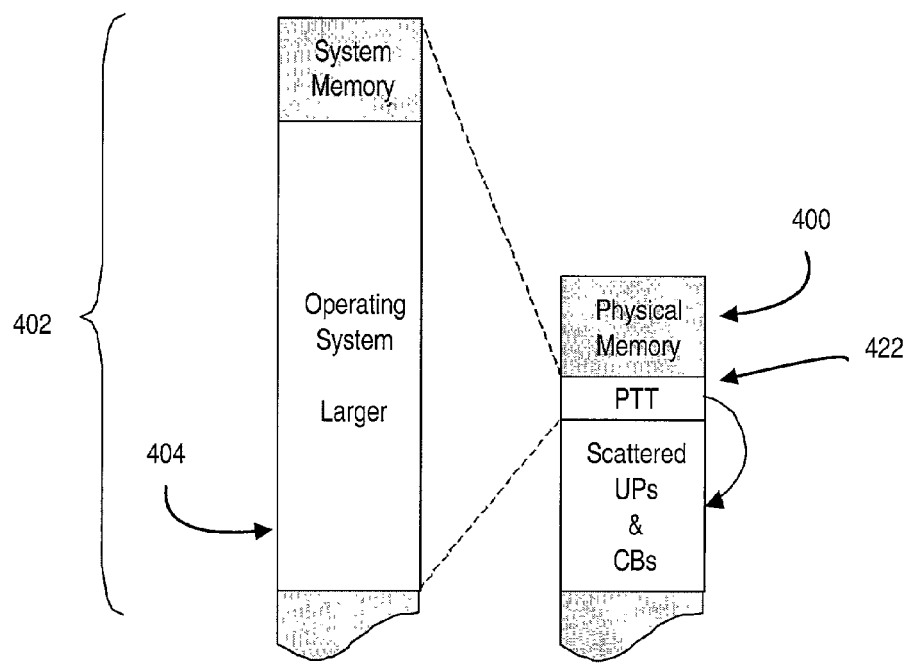
FIG. 8 illustrates an embodiment where the operating system is aware of the increased size of system memory provided by the CMMU.

FIG. 8 shows one embodiment of the system memory address space, wherein a portion 404 of the address space is used to store the operating system and a portion 402 is used for general system memory. The system memory portion 402 may store applications and other data. In one embodiment, a Page Translation Table (PTT) 422 may reside in physical memory 400 and may include a list of Page Translation Entries (PTEs). In one embodiment, a PTE may exist for each page in system memory. Each PTE may include a pointer to either a compressed page or uncompressed page located in physical memory 400. In some embodiments, as illustrated in FIG. 8, the operating system 404 may be aware of the increased size of system memory 402. In one embodiment, a kernel driver may be used to ensure that the operating system is able to safely use the entire system memory space 402 without overflowing physical memory 400. In embodiments where the operating system is aware of the increased size of system memory 402, it may be desired to maintain a ratio between compressed and uncompressed memory to provide the increased size of system memory 402. In these embodiments, the CMMU 214 may dynamically decide when to compress and/or decompress pages of memory to maintain the desired compression ratio and thus the increased size of system memory 402.

Figure 9:
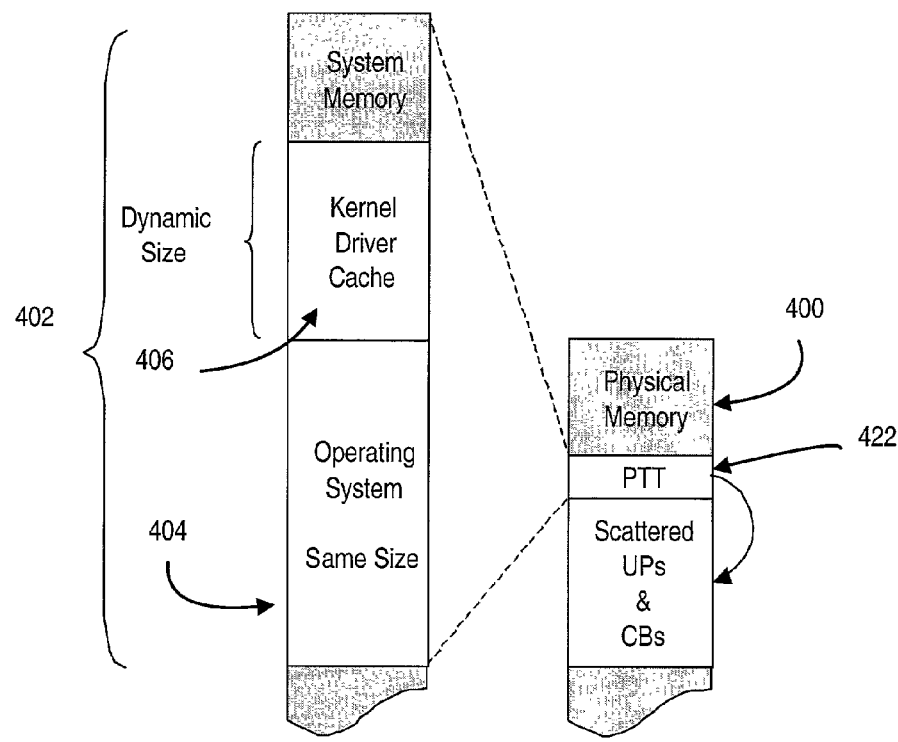
FIG. 9 illustrates an embodiment where the operating system is not aware of the increased size of system memory provided by the CMMU.

In some embodiments, as illustrated in FIG. 9, the operating system 404 may not be aware of the increased size of system memory 402. In these embodiments, only the kernel driver may be aware of the increased size of system memory 402. In yet other embodiments, the operating system may be aware of the increased size of a portion of system memory, but not be aware of another portion of system memory with increased size. In these embodiments, the kernel driver may be aware of all portions of system memory in which compression is being used to virtually increase the size of system memory. Some embodiments may provide for a plurality modes of operation, which may include a mode where the operating system is aware of the increased size of memory 402, a mode where the operating system is not aware of the increased size of system memory 402, and a "mixed mode" where the operating system is only aware of the increased size of a portion of system memory 402.

In some embodiments, a kernel driver may selectively compress system memory pages into a compressed cache 406 that, in one embodiment, is allowed to dynamically vary in size. In one embodiment, the kernel driver may not compete with, or allocate system memory 402 away from, the operating system 404. In one embodiment where the operating system 404 is not aware of the increased size of system memory 402, the CMMU 214 may allocate additional space by using physical addresses above locations of physical memory. In one embodiment where the operating system 404 is not aware, the Virtual Memory (VM) system may directly control the Compressed L3 cache.

In one embodiment, immediate data required for directory information may be held on-chip (e.g. eDRAM). In another embodiment, an on-chip (e.g. eDRAM) Most Recently Used (MRU) uncompressed page cache may be used. In one embodiment, this cache may be dynamically controlled, e.g. by the CMMU 214.

Figure 10:
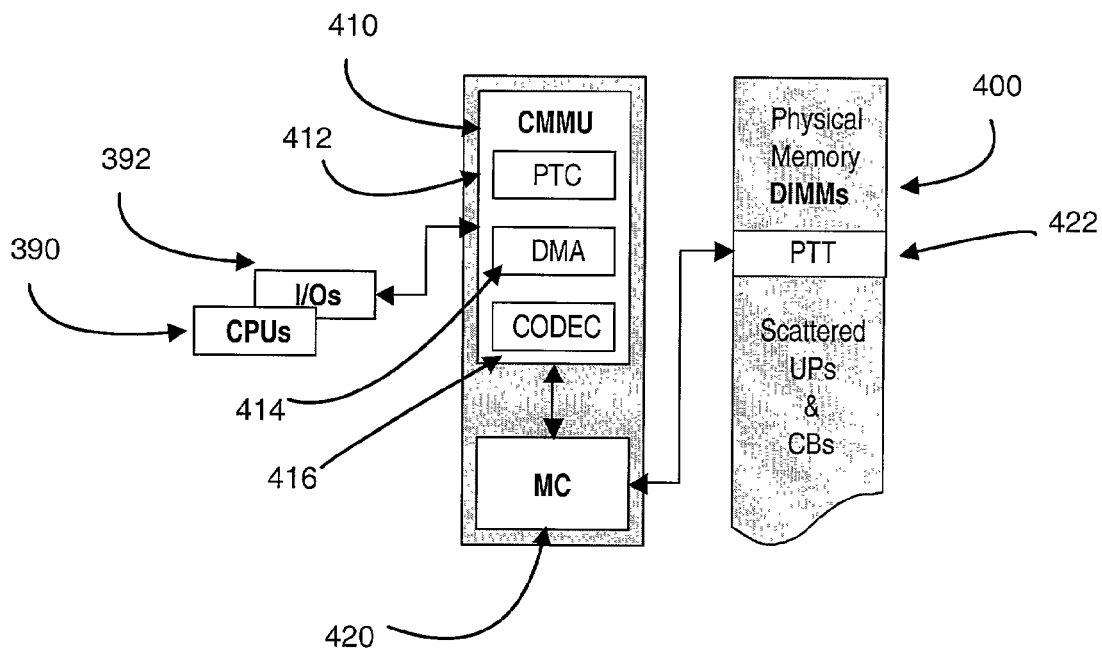
FIG. 10 illustrates a CMMU integrated into a system memory controller according to one embodiment.

FIG. 10 illustrates embodiments where a CMMU 410 is integrated into a system memory controller 420. The CMMU 410 may comprise the following hardware components: a Page Translation Cache (PTC) 412, one or more scatter/gather DMA channels 414, and a compression/decompression engine (CODEC) 416. The CMMU 410 may interact with the memory controller 420 to manage the system memory, including management of PTT 426, scattered UPs 426 and CBs 428. In one embodiment, the PTC 412 may be fully associative.

In one embodiment, the Compressed Memory Management Unit (CMMU) 410 may manage system memory on a page basis. In one embodiment, the CMMU 410 may allow an arbitrary number of pages to be compressed or uncompressed in system memory at any time. The number of compressed pages may be based on the compressibility of the data. In general, as the compressibility of the least recently used pages increases, the number of most recently and frequently used uncompressed pages can be increased.

In one embodiment, each uncompressed system page may be mapped to a page in physical memory 400. The page may be located anywhere in physical memory. Each compressed system page may be mapped to one or more smaller compressed blocks. Each compressed block may be located anywhere in physical memory. During normal operations, physical memory may become fragmented, so the compressed blocks may not be contiguous. Therefore, in one embodiment, the compressed blocks may be linked together.

Figure 11:
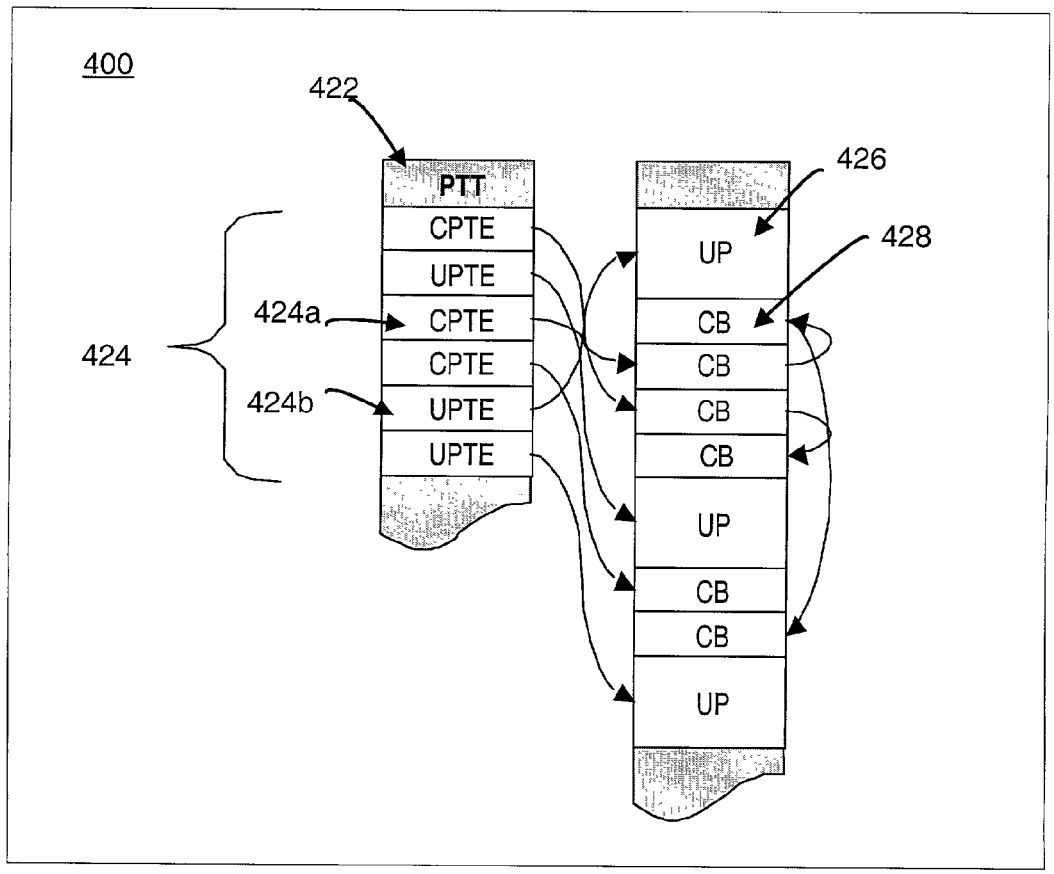
FIG. 11 illustrates software resources that the CMMU may manage in physical memory according to one embodiment.
Figure 14:
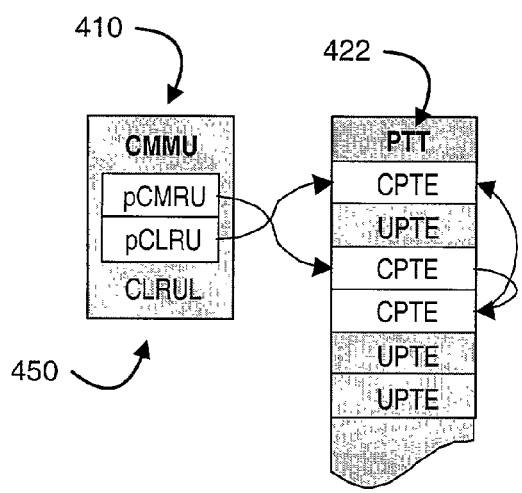
FIG. 14 illustrates PTEs that point to compressed pages and linked together to form a Compressed LRU List (CL-RUL) according to one embodiment.

FIG. 11 illustrates resources that the CMMU 410 may manage in physical memory. These resources include, but are not limited to: a Page Translation Table (PTT) 422 comprising Page Translation Entries (PTEs) 424, Uncompressed Pages (UPs) 426, and Compressed Blocks (CBs) 428. As shown, PTEs 424 may include Uncompressed PTEs (UPTEs) 424b that reference UPs 426 in system memory, and may also include compressed PTEs (CPTEs) 424a that reference CBs 428. In one embodiment, the unused UPs 426 may be linked together to form an Uncompressed Page Free List (UPFL). In one embodiment, the unused CBs 428 may be linked together to form a Compressed Block Free List (CBFL). In one embodiment, the PTEs 424 that reference uncompressed pages 426 may be linked together to form an Uncompressed Least Recently Used List (ULRUL). In one embodiment, the PTEs 424 that reference compressed blocks 428 may be linked together to form a Compressed LRU List (CLRUL) 450, as illustrated in FIG. 14.

In one embodiment, the Page Translation Table (PTT) 422 may be anchored anywhere in physical memory 400. PTT 422 may include a contiguous list of Page Translation Entries (PTEs) 424. In one embodiment, a PTE 424 may exist for each page in system memory. Each PTE 424 may include a pointer to either a compressed page 428 or uncompressed page 426 located in physical memory 400. In one embodiment, there may be two or more PTTs. In one embodiment, there may be one PTT for PTEs to compressed pages (CPTEs) 424a and one PTT for PTEs to uncompressed pages (UPTEs) 424b. In one embodiment, each table may be assigned a lookup virtual address range for entries.

Figure 12:
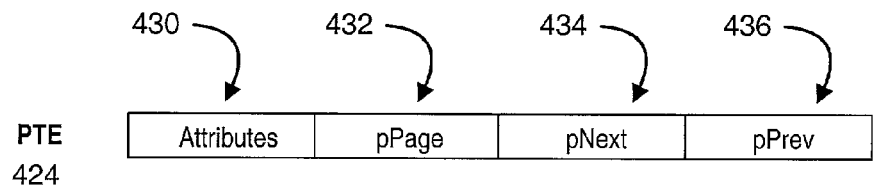
FIG. 12 illustrates a Page Translation Entry (PTE) including several elements according to one embodiment.

FIG. 12 illustrates one embodiment of a PTE 424. Each PTE 424 may include several elements. PTE 424 may include a page pointer 432 that may be used to indicate a compressed or uncompressed page associated with the PTE 424. In one embodiment, PTE 424 may include a next pointer 434 and previous pointer 436 that may be used in maintaining various lists, e.g. LRU lists. One or more LRU lists may be used by the CMMU 410 to maintain LRU information across the entire system memory address space. Maintaining LRU information in this manner may enable the CMMU 410 to employ a replacement strategy realizing much higher uncompressed page hit rates than otherwise possible.

Each PTE may include one or more attributes 430. In one embodiment, attributes 430 may include a Compressed attribute that may be used to indicate whether the PTE 424 points to a compressed page 428 or uncompressed page 426.

In one embodiment, attributes 430 may include Enabled and Valid attributes. If the PTE 424 is not Enabled as indicated by the Enabled attribute, then the CMMU 410 may use the system address to access physical memory directly. In one embodiment, the Enabled attribute may provide a mechanism for preventing certain system memory pages from ever being compressed, for example, critical operating system resources. If the PTE 424 is Enabled but not Valid as indicated by the Enabled and Valid attributes, then the CMMU 410 may only use the system address the first time the system memory page is accessed. Once the page has been accessed, the CMMU 410 may write the system address into the PTE 424 and marks the PTE 424 as Valid and not Compressed. In other words, the system address may become the pointer to the uncompressed page. In one embodiment, Enabled and not Valid may indicate the VM has previously written the uncompressed page, e.g. to I/O. In this embodiment, the page may not be compressed because this is a Most Recently Used (MRU) page.

In one embodiment, PTE 424 attributes 430 may include a Highly Compressible attribute which may be used to mark pages to be very highly compressible so that the pages take up much less space in the memory. In one embodiment, this attribute is a single bit attribute. In one embodiment, setting this attribute forces the page to be compressed to the maximum amount so that the page takes zero space. An optimally compressed page may be represented by an entry in the page table that does not actually point to any blocks of memory. Any compressed or uncompressed blocks formerly occupied by the page are thus returned to memory for use. In one embodiment, marking pages as Highly Compressible may occur when the OS 400 is aware of compression (as illustrated in FIG. 8), and the compression ratio is near or below the operating system's expected level. In this embodiment, a pool of pages that are inactive and clean may be maintained. These pages are available to be highly compressed to meet the required compression ratio. Thus, in embodiments where the operating system is aware of the increased size of memory, the operating system is "aware" in order to interact with the CMMU in dynamically maintaining a compression ratio. The operating system may not be directly aware that compression is being performed; rather, the operating system may only be aware that the memory appears larger than the actual physical size of memory. In this embodiment, while the operating system is aware that memory is larger, it may not be aware of which pages are compressed or uncompressed.

As an example of operation in an embodiment where the operating system is aware of the compression of memory, assume that the operating system currently desires a 2:1 compression ratio. To help maintain the 2:1 ratio, there may be an interrupt mechanism that may interrupt the kernel mode driver. When the interrupt handler is invoked, it can read the hardware (e.g. CMMU) to determine the current compression ratio. If the desired compression ratio is not currently being met, it may be necessary to free some pages. To free the pages, there may be an operating system call that allows the CMMU to start marking some pages to be very highly compressible. In embodiments where the operating system is not aware of the increased size of memory, the CMMU manages compression of memory without requiring operating system action.

There may be a plurality of programs running within the system. The programs each have a certain amount of active memory (e.g. pages in use). The CMMU may not be able to make active pages inactive and write them to disk in real time, as this may degrade system performance. Thus, the CMMU, through the interrupt mechanism, may monitor the performance of compressibility in the system. The amount of data that can be active for any one program may be restricted, and a pool of inactive pages that represent the least recently used active pages may be maintained. Some of these pages may be compressed and some of them may be uncompressed. Active pages may be dirty or clean. Inactive pages represent real pages and comprise real data. If an active page is dirty, the page may need to be written back to disk (i.e. made clean) before moving to the inactive pool. Thus, the inactive pages by definition are clean. These inactive pages may be invalidated and marked to be very highly compressible without making any memory allocations or requiring action by or notification to the operating system.

Thus, the data from an inactive page that has been marked highly compressible has been written to non-volatile storage (e.g. a disk). The PTE 424 for the page has been marked highly compressible. In one embodiment, a field in the attributes 430 may be used to indicate the page as "highly compressed". In one embodiment, this highly compressed attribute field may be a 1-bit field. The memory formerly occupied by the page may be freed for use by other processes (or by the same process). At some point, it may be necessary to "decompress" the page, now represented by only the PTE 424 (i.e. there is no memory allocated to the page). For example, a process may request one or more pages, and the PTE 424 may be used for the page. In one embodiment, if the Highly Compressed bit of a PTE 424 indicates that the page is highly compressed, rather than the decompression engine decompressing the highly compressed page represented by the PTE 424, a "zeroed" page may be synthesized by the CMMU. After the zeroed page is synthesized, data may be read from the non-volatile storage to the page. This data may include data that was previously written back to the non-volatile storage during the process of highly compressing the page.

Note that, in setting the highly compressed attribute field, the page is marked to be compressed as if the page was filled with all zeroes to achieve maximum compression. The page itself, however, does not have to be filled with all zeroes, nor does the page have to be compressed by the CODEC.

In one embodiment, once the CMMU 410 is enabled, the PTT 422, Compressed Block Free List (CBFL) and Uncompressed Page Free List (UPFL) may no longer be directly accessible by a processor or I/O master. To facilitate this, PTEs 424 that would normally point to these resources if marked not Enabled or not Valid, may be marked instead as Enabled, Valid and Highly Compressible.

In one embodiment, PTE 424 attributes 430 may include an Uncompressible attribute. If a page cannot be compressed, then the page may be marked Uncompressible. In one embodiment, future attempts by the CMMU 410 to compress the page marked as Uncompressible may be avoided. If the page is modified in the future by a processor or I/O master, then the Uncompressible attribute may be un-marked to indicate the page is compressible.

In one embodiment, PTE 424 attributes 430 may include a Reused attribute. When a processor or I/O master accesses a page, the page may be marked as Reused. The CMMU 410 may scan the uncompressed PTEs 424 looking for pages that have not been Reused recently according to the Reused attribute. These pages may become candidates for compression. One embodiment may use multiple levels of re-use, and thus may have a Reused attribute that supports the multiple levels, for example, with multiple flags.

In one embodiment, PTE 424 attributes 430 may include Next Accessed or Previous Accessed attributes, which may be used to indicate whether the next or previous page was accessed immediately after this page the last time that this page was accessed. In one embodiment, PTE 424 attributes 430 may only include the Next Accessed attribute. In one embodiment, the Next Accessed and/or Previous Accessed attributes may enable the CMMU 410 to predict the next page to be accessed. In one embodiment, this may used by the CMMU 410 to hide some or all decompression latency associated with the next page accessed in the event that, the next page accessed is compressed.

In one embodiment, the size of the PTT 422 may be based on a desired size of system memory 402. The following is included for exemplary purposes only, and is not intended to be limiting in any way. If a system contains 1 GB of physical memory 400 and the CMMU 410 is programmed to manage 4 GB of system memory 402 based on a compression ratio of 4:1, 4 KB pages and 12-Byte PTEs 424, then the PTT 422 may require 1 MB of PTEs 424, which would occupy 12 MB of physical memory 400.

In one embodiment, PTE 424 attributes 430 may include an attribute that may be used to indicate a particular compression algorithm used on a page. In one embodiment, a system may include a plurality of compression/decompression engines (CODECs) that may each implement one of a plurality of compression algorithms and its corresponding decompression algorithm. In one embodiment, this attribute, which may be referred to as a CODEC selector attribute, may be set to cause a particular compression algorithm to be used to compress the page, and thus also indicates the corresponding decompression algorithm. Alternatively, two or more alternative compression algorithms may be performed on the data, and one of the alternative compression algorithms may then be selected as the desired compression algorithm for the data. The optimal compression algorithm for the data may be selected, for example, based on compression ratio. In other words, the compression algorithm that yields the highest compression ratio for the data may be selected. Other criteria, or a combination of two or more criteria, may be used to select a compression algorithm from the plurality of alternative compression algorithms. For example, the fastest compression algorithm may be selected. When the data needs to be decompressed, the CODEC selector attribute may be used to determine the appropriate decompression algorithm for the data, and the compressed page or pages containing the data may then be routed to one or more CODECs that implement the decompression algorithm for decompression.

Page Translation Cache

In one embodiment, a Page Translation Cache (PTC) may be used to cache the most recently and frequently used PTEs 424 from the PTT 422. In this embodiment, the most recently and frequently used PTEs 424 may be accessed from the PTC rather than from the PTT 422, reducing access latency.

In one embodiment, the number of PTEs 424 in the PTC may be greater than the product of the number of Translation Lookaside Buffer (TLB) entries in each processor times the maximum number of processors supported by the system. In one embodiment, the PTC may be fully associative. In a fully associative cache, compares are performed on all entries in the cache in parallel. In one embodiment, if the PTC is very large, then a highly set associative cache at least equal to the product of the set associativity of the processor's largest cache times the maximum number of processors supported by the system may be used. In one embodiment, the rate at which PTEs 424 are reloaded into the PTC may be substantially lower than the rate at which processors reload their TLB entries. Thus, the latency added to reload a PTE 424 into the PTC may only occur when the processor has to perform a reload of a TLB entry or handle a page fault.

The following is intended for exemplary purposes only and is not intended to be limiting in any way. In one embodiment, if the PTC caches the most recently used (MRU) 32 MB of system memory, then 8K PTEs 424, or 96 KBs of SRAM, would be needed based on 4 KB pages and 12 B PTEs 424.

Uncompressed Page and Compressed Block Free Lists

Figure 13:
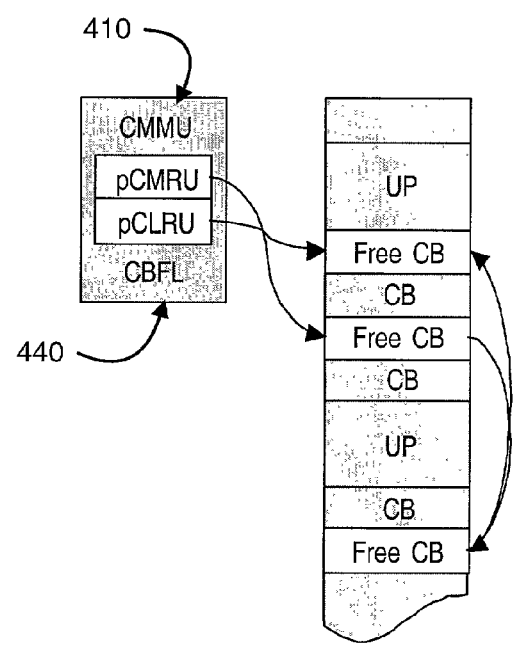
FIG. 13 illustrates a CMMU placing unused compressed blocks on a Compressed Block Free List (CBFL) according to one embodiment.

In one embodiment, physical memory may be partitioned into an arbitrary number of uncompressed pages and compressed blocks. In one embodiment, each PTE 424 may point either to an uncompressed page or to a first compressed block of a compressed page. In one embodiment, a portion (for example, the first four bytes) of a compressed block may point to the next compressed block of the compressed page. In one embodiment, a portion (for example, the second four bytes) of a compressed block may point back to a previous compressed block of the compressed page. This may provide the CMMU 410 with a mechanism to convert contiguous compressed blocks into uncompressed pages when needed. In one embodiment, the CMMU 410 may place unused uncompressed pages on an Uncompressed Page Free List (UPFL). In one embodiment, as illustrated in FIG. 13, the CMMU 410 may place unused compressed blocks on a Compressed Block Free List (CBFL) 440. As uncompressed pages and compressed blocks are needed, they may be pulled off these lists, if available. In one embodiment, a portion, for example, the first eight bytes, of a page or block may be used to build the free lists.

In one embodiment, when a compressed page is decompressed, the compressed blocks may be decompressed and copied to the oldest page pointed to by the UPFL. The compressed blocks may then become the newest blocks on the CBFL 440. In one embodiment, when an uncompressed page is compressed, the uncompressed page may be compressed and copied into the oldest blocks on the CBFL 440. The uncompressed page may then become the newest page on the UPFL.

In one embodiment, when an uncompressed page is compressed, the CMMU 410 may check if the CBFL 440 contains enough unused blocks to hold the compressed page. If there are enough unused blocks, then the CMMU 410 may transfer the compressed page into the unused blocks it needs. In one embodiment, if there are not enough unused blocks, then the CMMU 410 may convert an uncompressed page to compressed blocks. The CMMU 410 may convert an unused page from the UPFL, the original uncompressed page being compressed, or alternatively may convert the next LRU uncompressed page. Once the conversion is complete, and a sufficient number of unused compressed blocks are available, the CMMU 410 may complete the compression transfer. Any unused compressed blocks may be added to the CBFL 440.

In one embodiment, when a compressed page is decompressed, the CMMU 410 may check if the UPFL contains at least one unused page to hold the uncompressed page. If there is an unused page, then the CMMU 410 may transfer the decompressed page into it. In one embodiment, if the UPFL is empty, then the CMMU 410 may use the next LRU uncompressed page. In one embodiment, if the UPFL is empty, then the CMMU 410 may convert enough contiguous compressed blocks to create a page. In one embodiment, enough contiguous compressed blocks may not be found in the CBFL 440. In one embodiment, the CMMU 410 may copy the contents of contiguous compressed blocks currently in use by other compressed pages into unused blocks from the CBFL 440. The CMMU 410 may check the CBFL 440 to ensure there are enough unused blocks to hold a page before copying the contiguous compressed blocks. In one embodiment, if more unused blocks are needed, then the CMMU 410 may compress LRU uncompressed pages until enough unused compressed blocks are available.

In one embodiment, page-to-block and block-to-page conversions may only occur when there are insufficient unused blocks on the CBFL 440, or when the UPFL is empty, respectively. In one embodiment, a kernel driver may be used to tune the CMMU 410 by keeping each of these lists sufficiently large. The kernel driver may accomplish this using a CMMU API.

Compressed LRU and Uncompressed LRU Lists

In one embodiment, PTEs 424 that point to uncompressed pages may be linked together to form an Uncompressed LRU List (ULRUL). In one embodiment, PTEs 424 that point to compressed pages may be linked together to form a Compressed LRU List (CLRUL) 450 as illustrated in FIG. 14.

In one embodiment, when PTEs 424 are moved within a list or to another list, the next and previous pointers associated with the affected PTEs 424 are updated. In one embodiment, to reduce overhead, PTEs 424 may only be moved when accompanied by a compression or decompression operation. In one embodiment, a compression or decompression operation may not accompany an LRU update when a processor or I/O master accesses an uncompressed page that does not happen to be the MRU page in the ULRUL. In one embodiment, every uncompressed page access updates the ULRUL. Alternatively, the PTE 424 may be marked Reused.

In one embodiment, the CMMU 410 may periodically scan the ULRUL starting from the least recently used PTE 424. If the CMMU 410 finds a PTE 424 that is not marked as Reused, the system page address may be added to a Not Reused List (NRL). In one embodiment, the NRL may be a contiguous list of system addresses. In one embodiment, each NRL entry is four bytes. In one embodiment, the NRL is embodied as a hardware component and its length may be fixed. In another embodiment, the NRL is located in physical memory, and its length may be dynamically adjustable or programmable. In one embodiment, if the CMMU 410 finds a PTE 424 that is marked as Reused, the Reused attribute may be cleared. In one embodiment, whenever an uncompressed page needs to be compressed, the CMMU 410 may reference the NRL. When the CMMU 424 begins a new scan, it may overwrite the old NRL. If the NRL is empty, then the LRU uncompressed page on the ULRUL may be used. In one embodiment, once the NRL is full, the CMMU 410 may abort the current scan. In one embodiment, the generation and update of the NRL may be a memory controller background task. In another embodiment, the generation and update may be under driver control.

When a processor or I/O master accesses a compressed page, the page may be decompressed and become the MRU uncompressed page on the ULRUL. When replacing an uncompressed page or growing compressed space, the LRU uncompressed page may be compressed and become the MRU compressed page on the CLRUL 450. When shrinking compressed space, the MRU compressed page on the CLRUL 450 may be decompressed and become the LRU uncompressed page on the ULRUL. In one embodiment, when a kernel driver forces an uncompressed page to be compressed, the uncompressed page may be compressed and become a LRU compressed page on the CLRUL 450.

Figure 15:
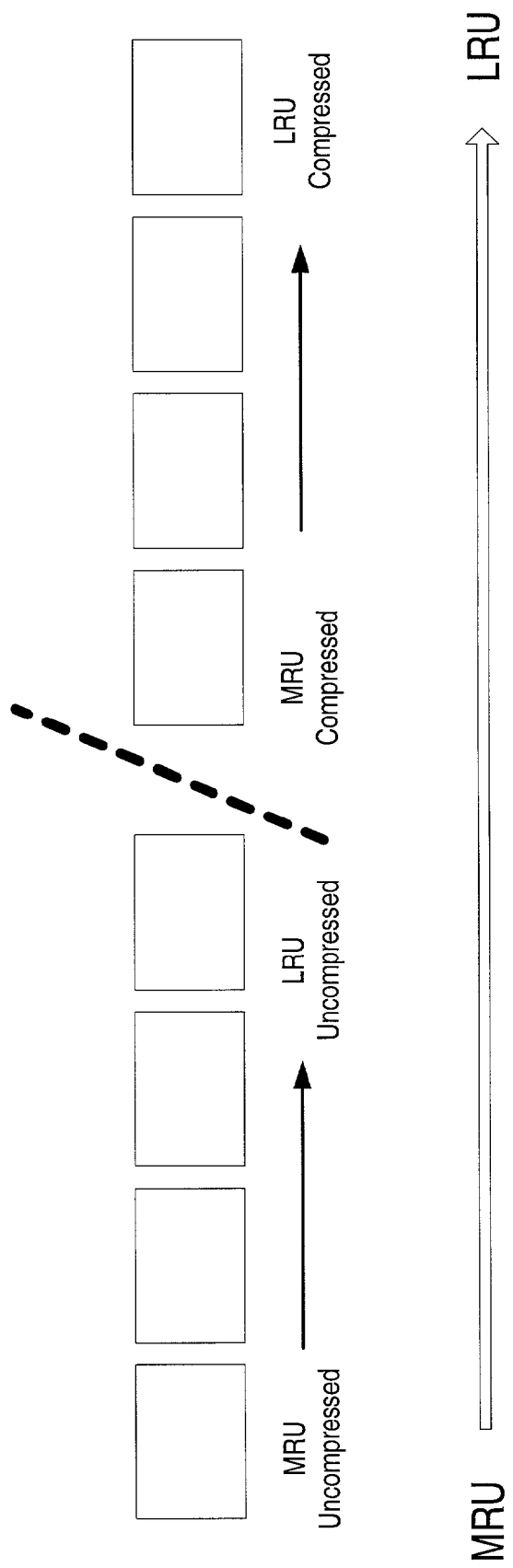
FIG. 15 illustrates a fully associative mechanism for managing compressed and uncompressed pages of memory according to one embodiment.

FIG. 15 illustrates a fully associative mechanism for managing compressed and uncompressed pages of memory. Using this fully associative mechanism, pages that are inactive and genuinely LRU are more likely to be compressed. The fully associative mechanism may also help in minimizing the degradation of system performance when compressing/decompressing pages of memory. In one embodiment, compressed and uncompressed pages of memory may be maintained using a fully associative page translation cache (PTC). In this embodiment, active pages (compressed and/or uncompressed) may not be where the operating system thinks they are, but instead may be cached by the CMMU in the fully associative PTC.

In the fully associative PTC, all compares are done in parallel. Data from any address may be stored in any PTC location. In one embodiment, the entire address may be used as the tag. All tags may be compared simultaneously (associatively) with the requested address, and if one matches then its associated data may be accessed. The fully associative PTC may be used for all pages in system memory.

An LRU algorithm may be used that spans all of memory. The fully associative algorithm may be able to maintain LRU across the entire congruence class. In one embodiment, there is only one congruence class. In one embodiment, a linked list, as illustrated in FIG. 15, may be used to determine what the true associativity is. This list may be a doubly linked list. The linked list may be partitioned at a dynamic point based on the compressibility of the data into an uncompressed page list portion and a compressed page list portion. Pages within each list portion may be ordered from Most Recently Used (MRU) pages to Least Recently Used (LRU) pages. When deciding to change the ratio of compressed pages to uncompressed pages, pages may be switched at the boundary created by the partition (i.e. LRU uncompressed pages may become MRU compressed pages). Thus, overall, the list may be used to maintain all pages from MRU to LRU, with the MRU uncompressed pages being the MRU pages and the LRU compressed pages being the LRU pages.

Basic Operations

The following describes embodiments of a method of operation of a CMMU 410 as illustrated in FIG. 10. When a processor 390 or I/O master 392 accesses system memory, the CMMU 410 may translate the system memory address of the access into a physical address. The CMMU 410 may perform a Page Translation Cache (PTC) lookup. If the PTE 424 is already in the PTC and points to an uncompressed page, then the CMMU 410 may pass the pointer to the uncompressed page to the memory controller. The memory controller may use this pointer to directly access physical memory. The PTE 424 may be marked Reused. If the PTE 424 is not already in the PTC, then the CMMU 410 may read the PTE 424 from the PTT 422 located in physical memory. The CMMU 424 may replace the LRU PTE 424 in the PTC to make room for the new PTE 424. In one embodiment, this replacement may occur after the transaction is completed to avoid more CPU and I/O contention during the current transaction. In one embodiment, an address range for uncompressed data may be used that does not require any look-up or translation.

If the PTE 424 points to a compressed page, then the CMMU 410 may read the PTE 424 from the PTT 422 located in physical memory into the PTC 412, and may load the pointer to the first compressed block into the DMA channel 414. If necessary, the CMMU 410 may replace the LRU PTE 424 in the PTC 412 to make room for the new PTE 424. The DMA channel 414 may read the appropriate number of linked compressed blocks and copy them into the CODEC 416. The CODEC 416 may decompress the compressed page in real-time. In one embodiment, a parallel decompression algorithm as described below may be used. The DMA channel 414 may read the uncompressed page from the CODEC 416 and copy it into an unused page pointed to by the Uncompressed Page Free List (UPFL). The compressed blocks pointers may be returned to the Compressed Block Free List (CBFL) 440. The CMMU 410 may update the PTE 424 to point to the uncompressed page. The CMMU 410 may update the CLRUL 450 and ULRUL appropriately. The CMMU 410 may pass the pointer to the uncompressed page to the memory controller. The memory controller may use this pointer to directly access physical memory.

In one embodiment, the above described method of handling the PTE 424 pointing to a compressed page may only be performed on memory operations that a kernel driver detects as VM requests to activate a stale page. In another embodiment, the above-described method may be performed on all memory operations.

In compressing an uncompressed page, the CMMU 410 may perform a PTC lookup. If the PTE 424 is already in the PTC 412, then the CMMU 410 may load the pointer to the uncompressed page into the DMA channel 414. If the PTE 424 is not already in the PTC 412, then the CMMU 410 may read the PTE 424 from the PTT 422 in physical memory. In one embodiment, the CMMU 410 may not load the PTE 424 into the PTC 412. The DMA channel 414 may read the uncompressed page from physical memory and load it into the CODEC 416. The CODEC 416 may compress the page in real-time. In one embodiment, a parallel compression algorithm as described below may be used. The DMA channel 414 may read the compressed page from the CODEC 416 and copy it into an appropriate number of linked compressed blocks from the CBFL 440. The uncompressed page may be returned to the UPFL. The CMMU 410 may update the PTE 424 in physical memory to point to the first compressed block of the compressed page. The CMMU 410 may update the CLRUL 450 and ULRUL as needed.

BIOS

In one embodiment where the operating system is aware of the increased size of system memory, the CMMU 410 may be initialized and enabled by BIOS. In one embodiment where the operating system is not aware of the increased size of system memory, the CMMU 410 may be initialized and enabled during BIOS. In another embodiment where the operating system is not aware of the increased size of system memory, the CMMU 410 may be initialized and enabled after the operating system has booted.

In one embodiment where BIOS initializes and enables the CMMU 410 before the operating system is booted, after BIOS has tested physical memory, BIOS may reserve a portion of physical memory for PTT 422 use. In one embodiment, BIOS may initialize the PTT 422 so that all PTEs 424 are marked Enabled and Invalid. BIOS may partition a portion of physical memory into compressed blocks and uncompressed pages. BIOS may link unused compressed blocks together to create a CBFL 440. BIOS may link unused uncompressed pages together to create the UPFL. BIOS may initialize and enable the CMMU 410. Initializing the CMMU 410 may include programming a maximum size of system memory and a maximum compression ratio. In one embodiment, once enabled, the PTEs 424 may become Valid naturally over time as a processor 390 or I/O master 392 accesses system memory. In one embodiment, once enabled, the PTT 422, CBFL 440 and UPFL may be transparent to a processor 390 or I/O master 392.

In one embodiment, BIOS may prevent certain system memory pages from being compressed, such as critical operating system resources. For example, BIOS may mark the PTEs 424 associated with critical pages in the PTT 422 as not Enabled.

Kernel Driver

In one embodiment where the operating system is aware of the increased size of system memory, a kernel driver may be used to ensure that the operating system may safely use the entire system memory space without overflowing physical memory. In one embodiment, the kernel driver may accomplish this by ensuring that a minimum average compression ratio across the entire system memory space is maintained.

In one embodiment, the CMMU 410 may include registers that indicate the number of compressed blocks and uncompressed pages that are currently in use. A kernel driver may use this information to determine the effective size of system memory. In one embodiment, if the average compression ratio drops below a programmable threshold, then a kernel driver may respond by: 1) allocating system memory pages from the operating system 2) filling these memory pages with a highly compressible data code to force all processors to flush their caches associated with these pages, and 3) forcing the CMMU 410 to mark these pages as highly compressible so that no compressed blocks are wasted. In one embodiment, the kernel driver does not actually use these pages. The kernel driver may do this to control the average compression ratio of system memory. When the average compression ratio rises above a programmable threshold, then the kernel driver may deallocate these system memory pages back to the operating system.

In one embodiment where the operating system is aware of the increased size of system memory, in order for a kernel driver to access system memory beyond the amount of which the operating system is aware, the kernel driver may create its own processor PTEs 424. The kernel driver may use this space to selectively compress system memory pages into a compressed cache. The compressed cache may grow into the system memory space of which the operating system is not aware. As a result, the kernel driver may not compete with or allocate system memory away from the operating system. This may eliminate the need for a kernel driver to guarantee a minimum compression ratio. Performance-sensitive applications that either allocate non-paged system memory or are self-tuning based on the amount of system memory available thus may not be affected. In one embodiment, the size of the compressed cache may be dynamic and may vary based on the compressibility of system memory. In one embodiment, the compressed cache may grow as large as the maximum size of system memory minus the actual size of physical memory.

In one embodiment, when a kernel driver wants to compress a system memory page into a compressed cache that is not accessible by the operating system, the kernel driver may force the page to be conditionally compressed by initiating a special CMMU 410 operation. In one embodiment, if a minimum compression ratio specified in the Command Block is not achieved by the CODEC 416, then the CMMU 410 does not copy the compressed page into the compressed cache.

In one embodiment, using a compressed cache that is not accessible by the operating system may allow a kernel driver to employ software caching algorithms without burdening the hardware to selectively choose which pages to allocate or deallocate from a compressed cache. In one embodiment, using a compressed cache that is not accessible by the operating system may allow a kernel driver to manage the dynamic size of the compressed cache. In one embodiment, compressed caches managed by one or more kernel drivers may be used for various functions including local and remote disk caching, virtual memory caching, network caching, RAM disks, etc.

In one embodiment where BIOS does not enable the CMMU 410, the kernel driver may initialize and enable the CMMU 410. In this embodiment, the kernel driver may allocate a small portion of system memory for PTT 422 use. In one embodiment, the kernel driver may initialize the PTT 422 so that all PTEs 424 are marked Enabled and Invalid. The kernel driver may allocate a small portion of system memory and partition it into compressed blocks and uncompressed pages. The kernel driver may link the unused compressed blocks together to create the CBFL 440, and the unused uncompressed pages together to create the UPFL. The kernel driver may initialize and enable the CMMU 410. In one embodiment, initializing the CMMU 410 may include programming a maximum size of system memory and a maximum compression ratio. In one embodiment, once enabled, the PTEs 424 may become valid naturally over time as a processor 390 or I/O master 392 accesses system memory. In one embodiment, once enabled, the PTT 422, CBFL 440 and UPFL may be transparent to a processor 390 or I/O master 392.

In one embodiment, a kernel driver may prevent certain system memory pages from being compressed, such as critical operating system resources. For example, the kernel driver may mark the PTEs 424 associated with critical pages in the PTT 422 as not Enabled.

CMMU API

In one embodiment, in addition to managing and handling accesses to the uncompressed and compressed pages in system memory, the CMMU 410 may have an Application Programming Interface (API) that enables a kernel driver to initiate various CMMU 410 operations.

In one embodiment, when a kernel driver wants to initiate a CMMU 410 operation, it may set up a Command Block in system memory and write the system address of the Command Block into the appropriate CMMU 410 register. When the CMMU 410 is not busy, it may read the Command Block and perform the operation. When the operation is complete, the CMMU 410 may update the Status of the Command Block. In one embodiment, the CMMU 410 performs one operation at a time. In one embodiment, the kernel driver may manage the serialization of operations to the CMMU 410. The kernel driver may poll the Status of the Command Block to determine when the operation is complete. In one embodiment, the Command Block may reside in coherent system memory so that the kernel driver may cache the Status of the Command Block in the processor. The processor may come back out on the host bus when the CMMU 410 updates the Status of the Command Block, causing the corresponding cache line to be invalidated in the processor's cache.

Examples of CMMU 410 operations that may be initiated by a kernel driver include, but are not limited to operations to: 1) force a specific or LRU/MRU system memory page to be compressed/decompressed, 2) change the PTE 424 attributes of a system memory page, 3) compress/decompress and copy a system memory page to another system memory page location, 4) copy a compressed page "as is" to an uncompressed page without decompressing the page, 5) copy an uncompressed page "as is" to a compressed page without compressing the page, and 6) convert contiguous compressed blocks into an unused uncompressed page.

Scatter/Gather DMA Channel

In one embodiment, scatter/gather DMA channel 414 may not need to be coherent during compressed block transfers, since these transfers may be transparent to a processor 390 or I/O master 392. However, the uncompressed page transfers may need to be coherent in order to force a processor to flush any cache lines associated with the transfer. If a processor 390 or I/O master 392 accesses the system memory page while it is being compressed, then the CMMU 410 may abort the compression operation. In one embodiment, there may be a plurality of scatter/gather DMA channels 414.

In one embodiment, if the CMMU 410 decompresses a system memory page that is marked Zeros, then the scatter/gather DMA channel 414 may fill the uncompressed page with a data pattern, e.g. all zeros.

In one embodiment, the scatter/gather DMA channel 414 may utilize a CODEC 416 that is integrated into the system memory controller 420 to compress or decompress a page using a single memory-to-memory DMA transfer. Alternatively, the DMA channel 414 may utilize one or more CODECs 416 that reside elsewhere, for example, on one or more memory modules such as industry standard DIMMs, to compress or decompress a page using a memory-to-CODEC and a CODEC-to-memory DMA transfer.

In one embodiment, if the memory controller 420 executes processor 390 and I/O master 392 system memory accesses "in order", then the memory controller 420 may stall all subsequent system memory accesses if the current access is to a compressed page that has to be decompressed before it can be accessed. In one embodiment, the memory controller may return a Deferred response for those system memory accesses that miss the PTC and thus require additional physical memory accesses.

Compression/Decompression Engine

In one embodiment, the Compression/Decompression Engine (CODEC) 416 may be optimized to perform page-based compressions and decompressions. If a system memory page is uncompressible, then the CMMU keeps the page uncompressed. The CMMU 410 may mark the system memory page's PTE 424 as Uncompressible. When the system memory page is modified by a processor 390 or I/O master 392, the CMMU 410 may mark the page not Uncompressible (i.e. Compressible).

In one embodiment, a DMA-based CODEC 416 is unlikely to fully utilize the physical memory bus bandwidth available, and thus multiple DMA-based CODECs 416 may be included. In one embodiment, there may be a DMA-based CODEC 416 for each processor in the system.

Parallel Compression/Decompression Engine

In one embodiment, the CODEC 416 may be a parallel data compression and decompression engine, designed for the reduction of data bandwidth and storage requirements and for compressing/decompressing data at a high rate. The parallel compression/decompression engine may alternatively be included in any of various devices, including a memory controller; memory modules; a processor or CPU; peripheral devices, such as a network interface card, modem, IDSN terminal adapter, ATM adapter, etc.; and network devices, such as routers, hubs, switches, bridges, etc., among others. In the present embodiment, the parallel compression and decompression engine may be included on a CMMU as described above. In embodiments where the parallel compression and decompression engine is included on another device, the CMMU may interface with the engine on the device to perform compression and decompression operations on memory transfers as needed. In one embodiment, the system may include a plurality of parallel data compression and decompression engines.

Data transfers initiated by the CMMU on the system may be in either of two formats: compressed or normal (non-compressed). In one embodiment, the CMMU includes parallel compression and decompression engines designed to process stream data at more than a single byte or symbol (character) at one time. These parallel compression and decompression engines modify a single stream dictionary based (or history table based) data compression method, such as that described by Lempel and Ziv, to provide a scalable, high bandwidth compression and decompression operation. The parallel compression method examines a plurality of symbols in parallel, thus providing greatly increased compression performance.

Parallel Compression

The parallel data compression engine and method included on one embodiment of the CMMU operate to perform parallel compression of data. In one embodiment, the parallel compression method first involves receiving uncompressed data, wherein the uncompressed data comprises a plurality of symbols. The method also may maintain a history table comprising entries, wherein each entry comprises at least one symbol. The method may operate to compare a plurality of symbols with entries in the history table in a parallel fashion, wherein this comparison produces compare results. The method may then determine match information for each of the plurality of symbols based on the compare results. The step of determining match information may involve determining zero or more matches of the plurality of symbols with each entry in the history table. The method then outputs compressed data in response to the match information.

In one embodiment, the method maintains a current count of prior matches that occurred when previous symbols were compared with entries in the history table. The method may also maintain a count flag for each entry in the history table. In this embodiment, the match information is determined for each of the plurality of symbols based on the current count, the count flags and the compare results.

The step of determining match information may involve determining a contiguous match based on the current count and the compare results, as well as determining if the contiguous match has stopped matching. If the contiguous match has stopped matching, then the method updates the current count according to the compare results, and compressed data is output corresponding to the contiguous match. The step of determining match information may also include resetting the count and count flags if the compare results indicate a contiguous match did not match one of the plurality of symbols. The count and count flags for all entries may be reset based on the number of the plurality of symbols that did not match in the contiguous match.

For a contiguous match, the output compressed data may comprise a count value and an entry pointer. The entry pointer points to the entry in the history table that produced the contiguous match, and the count value indicates a number of matching symbols in the contiguous match. The count value may be output as an encoded value, wherein more often occurring counts are encoded with fewer bits than less often occurring counts. For non-matching symbols that do not match any entry in the history table, the non-matching symbols may be output as the compressed data.

The above steps may be repeated one or more times until no more data is available. When no more data is available, compressed data may be output for any remaining match in the history table.

The parallel data compression engine may be used to perform parallel compression, operating on a plurality of symbols at a time. In one embodiment, the parallel compression method accounts for symbol matches comprised entirely within a given plurality of symbols, referred to as the "special case". Here presume that the plurality of symbols includes a first symbol, a last symbol, and one or more middle symbols. The step of determining match information includes detecting if at least one contiguous match occurs with one or more respective contiguous middle symbols, and the one or more respective contiguous middle symbols are not involved in a match with either the symbol before or after the respective contiguous middle symbols. If this condition is detected, then the method selects the one or more largest non-overlapping contiguous matches involving the middle symbols. In this instance, compressed data is output for each of the selected matches involving the middle symbols.

The compression circuit of the parallel data compression engine may include an input for receiving uncompressed data, a history table, a plurality of comparators, a memory, match information logic, and an output for outputting compressed data. The input receives uncompressed data that comprises a plurality of symbols. The history table comprises a plurality of entries, wherein each entry comprises at least one symbol. The plurality of comparators are coupled to the history table and operate to compare a plurality of symbols with each entry in the history table in a parallel fashion, wherein the plurality of comparators produce compare results. The memory maintains a current count of prior matches that occurred when previous symbols were compared with entries in the history table. The memory may also maintain a count flag or value for each entry in the history table. The match information logic is coupled to the plurality of comparators and the memory and operates to determine match information for each of the plurality of symbols based on the current count, count flags and the compare results. The output is coupled to the match information logic for outputting compressed data in response to the match information.

For more information on the parallel compression operation, please see U.S. patent application Ser. No. 09/421,968 titled "System and Method for Performing Scalable Embedded Parallel Data Compression", which was incorporated by reference above.

Parallel Decompression

The parallel decompression engine and method implemented on a CMMU operate to decompress input compressed data in one or more decompression cycles, with a plurality of codes (tokens) typically being decompressed in each cycle in parallel. A parallel decompression engine may include an input for receiving compressed data, a history table (also referred to as a history window), and a plurality of decoders for examining and decoding a plurality of codes (tokens) from the compressed data in parallel in a series of decompression cycles. A code or token may represent one or more compressed symbols or one uncompressed symbol. The parallel decompression engine may also include preliminary select generation logic for generating a plurality of preliminary selects in parallel. A preliminary select may point to an uncompressed symbol in the history window, an uncompressed symbol from a token in the current decompression cycle, or a symbol being decompressed in the current decompression cycle. The parallel decompression engine may also include final select generation logic for resolving preliminary selects and generating a plurality of final selects in parallel. Each of the plurality of final selects points either to an uncompressed symbol in the history window or to an uncompressed symbol from a token in the current decompression cycle. The parallel decompression engine may also include uncompressed data output logic for generating the uncompressed data from the uncompressed symbols pointed to by the plurality of final selects, and for storing the symbols decompressed in this cycle in the history window. The decompression engine may also include an output for outputting the uncompressed data produced in the decompression cycles.

The decompression engine may be divided into a series of stages. The decoders may be included in a first stage. The preliminary select generation logic may be included in a second stage. The final select generation logic may be included in a third stage. The output logic may be included in a fourth stage.

Decompression of compressed data may begin in the decompression engine when the decompression engine receives a compressed input stream. The compressed input stream may then be decompressed in parallel in one or more decode (or decompression) cycles, resulting in a decompressed output stream.

In a decompression cycle, a plurality of tokens from the compressed data stream may be selected for the decompression cycle and loaded in the decompression engine, where N is the total number of decoders. The tokens may be selected continuously beginning with the first token in the input data stream. A section may be extracted from the compressed data stream to serve as input data for a decompression cycle, and the tokens may be extracted from the extracted section. For example, a section of four bytes (32 bits) may be extracted. A token may be selected from an input section of the input data stream for the decompression cycle if there is a decoder available, and if a complete token is included in the remaining bits of the input section. If any of the above conditions fails, then the decompression cycle continues, and the token that failed one of the conditions is the first token to be loaded in the next decompression cycle.

As the tokens for the decompression cycle are selected, the tokens are passed to the decoders for decoding. One decoder may process one token in a decompression cycle. The decoders may decode the input tokens into start counts, indexes, index valid flags, and data valid flags, with one copy of each from each decoder being passed to the next stage for each of the output bytes to be generated in the decompression cycle. The original input data bytes are passed from the decoders for later possible selection as output data. A data byte is valid only if the token being decoded on the decoder represents a byte that was stored in the token in uncompressed format by the compression engine that created the compressed data. In this case, the uncompressed byte is passed in the data byte for the decoder, the data byte valid bit for the decoder is set, and the index valid bit for the decoder is cleared.

Next, the information generated by the decoders is used to generate preliminary selects for the output bytes. Overflow bits are also generated for each preliminary select. The preliminary selects and overflow bits are passed to the next stage, where the overflow bits are inspected for each of the preliminary selects. If the overflow bit of a preliminary select is not set, then the contents of the preliminary select point to one of the entries in the history window if the index valid bit is set for the output byte, or to one of the data bytes if the data byte valid bit is set for the output byte. Preliminary selects whose overflow bits are not set are passed as final selects without modification. If the overflow bit is set, then the contents of the preliminary select are examined to determine which of the other preliminary selects is generating the data this preliminary select refers to. The contents of the correct preliminary select are then replicated on this preliminary select, and the modified preliminary select is passed as a final select.

The final selects are used to extract the uncompressed symbols. The final selects may point either to symbols in the history window or to data bytes passed from the decoders. The uncompressed symbols are extracted and added to the uncompressed output symbols. A data valid flag may be used for each of the output data symbols to signal if this output symbol is valid in this decompression cycle. The uncompressed output data may then be appended to the output data stream and written into the history window.

For more information on the parallel decompression operation, please see U.S. patent application Ser. No. 09/491,343 titled "System and Method for Performing Scalable Embedded Parallel Data Decompression", which was incorporated by reference above.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for compressing memory in a system comprising a plurality of compression engines and a physical memory, wherein the physical memory comprises system memory, the method comprising:

locating a page translation entry in a page translation table, wherein the page translation entry references an uncompressed page in the physical memory;

providing the referenced uncompressed page to the plurality of compression engines, wherein each of the plurality of compression engines implements a different compression algorithm;

the plurality of compression engines each compressing the uncompressed page using the compression algorithm implemented by the particular compression engine to produce a plurality of compressed pages each compressed by a different compression algorithm;

selecting the compressed page with the highest compression ratio of the plurality of compressed pages; and writing the selected compressed page to the physical memory.

2. The method of claim 1, further comprising marking the page translation entry associated with the selected compressed page to indicate the particular compression algorithm used in said compressing the page.

3. The method of claim 1, further comprising:

determining that the compressed page needs to be decompressed:

examining the page translation entry to determine the particular compression algorithm used to compress the page;

selecting a decompression engine from a plurality of decompression engines, wherein the selected decompression engine implements a decompression algorithm for decompressing data compressed using the particular compression algorithm;

providing the page to the selected decompression engine; and the selected decompression engine decompressing the page using the decompression algorithm to produce the decompressed page.

4. The method of claim 1, wherein the compression of pages of the memory in the system is operable to increase the effective size of the system memory by keeping least recently used data as compressed data in the physical memory and most recently and frequently used data as uncompressed data in the physical memory.

5. The method of claim 4, wherein the system further comprises an operating system, wherein the operating system is not aware of the increased effective size of the system memory.

* * * * *